(12) United States Patent
Brown et al.

(10) Patent No.: US 11,428,171 B2
(45) Date of Patent: Aug. 30, 2022

(54) ELECTRIC MACHINE ASSISTANCE FOR MULTI-SPOOL TURBOMACHINE OPERATION AND CONTROL

(71) Applicant: General Electric Company, Schenectady, NY (US)

(72) Inventors: Thomas William Brown, Cincinnati, OH (US); Justin Paul Smith, Montgomery, OH (US); Dominic Barone, Centerville, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 162 days.

(21) Appl. No.: 16/705,341

(22) Filed: Dec. 6, 2019

(65) Prior Publication Data
US 2021/0172384 A1 Jun. 10, 2021

(51) Int. Cl.
*F02C 9/28* (2006.01)
*F02C 6/20* (2006.01)

(52) U.S. Cl.
CPC .............. *F02C 9/28* (2013.01); *F02C 6/20* (2013.01); *F05D 2220/30* (2013.01)

(58) Field of Classification Search
None
See application file for complete search history.

(56) References Cited

U.S. PATENT DOCUMENTS

| | | |
|---|---|---|
| 608 A | 2/1838 | Moon |
| 1,206 A | 6/1839 | Burt et al. |
| 3,997,131 A | 12/1976 | Kling |
| 4,246,531 A | 1/1981 | Jordan |
| 5,432,383 A | 7/1995 | Kawamura |
| 5,694,765 A | 12/1997 | Hield et al. |
| 6,467,725 B1 | 10/2002 | Coles et al. |
| 7,513,120 B2 | 4/2009 | Kupratis |
| 7,635,922 B2 | 12/2009 | Becker |

(Continued)

FOREIGN PATENT DOCUMENTS

| | | |
|---|---|---|
| CN | 101652535 A | 2/2010 |
| CN | 103228872 A | 7/2013 |

(Continued)

OTHER PUBLICATIONS

European Search Report and Opinion issued in connection with Corresponding EP Application No. 16183972.5 dated Dec. 21, 2016.

(Continued)

*Primary Examiner* — Gerald L Sung
(74) *Attorney, Agent, or Firm* — Dority & Manning, P.A.

(57) ABSTRACT

A multi-spool turbomachine having an electric machine that can be controlled to input power to one of the spools of the turbomachine is provided. In one aspect, the multi-spool turbomachine can be a hybrid electric gas turbine engine for an aircraft. The hybrid electric gas turbine engine can include a first spool, a second spool, and an electric machine operatively coupled with the first spool. In response to an increase in thrust demand, the electric motor receives electrical power from an electrical power source. In turn, the electric machine applies a torque to the first spool, causing the first spool to increase in rotational speed. In this manner, the electric machine can electrically assist the turbomachine to meet the increase in thrust demand.

20 Claims, 10 Drawing Sheets

(56) References Cited

U.S. PATENT DOCUMENTS

| | | | |
|---|---|---|---|
| 7,878,005 B2 | 2/2011 | Bradbrook et al. | |
| 7,926,287 B2 | 4/2011 | Ullyott et al. | |
| 7,973,422 B2 | 7/2011 | Colin et al. | |
| 7,975,465 B2 | 7/2011 | Morris et al. | |
| 8,039,983 B2 | 10/2011 | Cote et al. | |
| 8,112,983 B2 | 2/2012 | Bradbrook et al. | |
| 8,201,414 B2 | 6/2012 | Haehner et al. | |
| 8,365,510 B2 | 2/2013 | Lugg | |
| 8,561,413 B2 | 10/2013 | Taneja | |
| 8,636,241 B2 | 1/2014 | Lugg et al. | |
| 9,045,996 B2 | 6/2015 | Anghel et al. | |
| 9,260,195 B2 | 2/2016 | Oyori et al. | |
| 9,416,820 B2 | 8/2016 | Ertas et al. | |
| 9,664,070 B1 | 5/2017 | Clauson et al. | |
| 10,196,923 B2 | 2/2019 | Thomassin | |
| 2002/0142208 A1 | 10/2002 | Keefer et al. | |
| 2003/0143448 A1 | 7/2003 | Keefer | |
| 2005/0056021 A1 | 3/2005 | Belokon et al. | |
| 2006/0042252 A1 | 3/2006 | Derouineau | |
| 2010/0058731 A1 | 3/2010 | Haehner et al. | |
| 2010/0083632 A1* | 4/2010 | Foster | B64D 27/16 60/39.181 |
| 2012/0017602 A1 | 1/2012 | Hansen et al. | |
| 2012/0167590 A1 | 7/2012 | Bettner | |
| 2012/0221157 A1 | 8/2012 | Finney et al. | |
| 2013/0064685 A1* | 3/2013 | Cheng | B60H 1/3208 417/44.1 |
| 2013/0076120 A1 | 3/2013 | Wagner et al. | |
| 2013/0139519 A1 | 6/2013 | Kesseli et al. | |
| 2013/0147192 A1 | 6/2013 | Condon et al. | |
| 2013/0205794 A1 | 8/2013 | Xu | |
| 2013/0234506 A1 | 9/2013 | Langford et al. | |
| 2013/0340521 A1 | 12/2013 | Clark et al. | |
| 2014/0338352 A1 | 11/2014 | Edwards et al. | |
| 2015/0100180 A1 | 4/2015 | Oyori et al. | |
| 2015/0377052 A1 | 12/2015 | Hill et al. | |
| 2016/0023773 A1 | 1/2016 | Himmelmann et al. | |
| 2016/0359324 A1 | 12/2016 | Knowles et al. | |
| 2017/0029131 A1 | 2/2017 | Steinwandel et al. | |
| 2017/0138272 A1* | 5/2017 | Kusumi | F02C 7/057 |
| 2017/0159577 A1 | 6/2017 | Hino et al. | |
| 2017/0159665 A1 | 6/2017 | Bergamini et al. | |
| 2017/0274992 A1 | 9/2017 | Chretien | |
| 2017/0320584 A1 | 11/2017 | Menheere | |
| 2018/0003072 A1* | 1/2018 | Lents | F02C 7/36 |
| 2018/0142662 A1 | 5/2018 | Dal et al. | |
| 2018/0231023 A1 | 8/2018 | Gentry et al. | |
| 2018/0252158 A1 | 9/2018 | Malkamaki et al. | |
| 2018/0342917 A1 | 11/2018 | Hunter et al. | |
| 2019/0003397 A1* | 1/2019 | Gansler | F02C 6/14 |
| 2019/0006879 A1* | 1/2019 | Raffaelli | H02J 7/1492 |
| 2019/0010869 A1 | 1/2019 | Kerth | |
| 2019/0013722 A1 | 1/2019 | Yu | |
| 2019/0052206 A1 | 2/2019 | Noderer | |
| 2019/0052208 A1 | 2/2019 | Noderer | |
| 2019/0085715 A1 | 3/2019 | van der Merwe et al. | |
| 2019/0280583 A1* | 9/2019 | Nagafuchi | F02C 6/00 |
| 2019/0353104 A1* | 11/2019 | Kupratis | F02K 5/00 |
| 2020/0025149 A1* | 1/2020 | Hrach | F01D 11/14 |
| 2020/0094977 A1* | 3/2020 | Patel | H02P 6/20 |

FOREIGN PATENT DOCUMENTS

| | | | |
|---|---|---|---|
| CN | 103998723 A | 8/2014 | |
| EP | 1947311 A2 | 7/2008 | |
| EP | 2657457 A2 | 10/2013 | |
| EP | 2728141 A2 | 5/2014 | |
| JP | H02164695 A | 6/1990 | |
| JP | 2014501875 A | 1/2014 | |

OTHER PUBLICATIONS

Notification of Reasons for Refusal Issued in Connection with Corresponding JP Application No. 2016-155170 dated Jun. 12, 2017.

First Oa and Search Issued in Connection with Corresponding CN Application No. 20160660083.6 dated Jul. 31, 2017.

FAA, Airplane Turbofan Engine Operation and Malfunctions Basic Familiarization for Flight Crews, 2006, Chapter 1, pp. 1-38, Retrieved from https://web.archive.org/web/20061001012449/https://www.faa.gov/aircraft/air_cert/design_approvals/engine_prop/media/engine_malf_famil.doc Dec. 10, 2018 (Year 2006), 38 Pages.

Zahringer, Towards the Powerhouse for More Electric Aircraft-Dedicated Engine Concepts, American Institute of Aeronautics and Astronautics, Inc., IS ABE-2009-1166, 2009, pp. 1-7.

Schneider, Clad in Controversy, IEEE Spectrum, Aug. 2013, 38 Pages.

U.S. Appl. No. 15/823,952 filed Nov. 28, 2017.

Canadian Patent Application No. CA 3024225 Filed Nov. 15, 2018.

EP Patent Application No. EP 18208312.1 Filed Nov. 26, 2018.

China Patent Application No. CN 201811423041.6 Filed Nov. 27, 2018.

* cited by examiner

ELECTRIC MACHINE ASSISTANCE FOR MULTI-SPOOL TURBOMACHINE OPERATION AND CONTROL

FIELD

The present disclosure relates generally to multi-spool turbomachines having at least one electric machine operable to assist with operation and control thereof.

BACKGROUND

For multi-spool gas turbine engines for aircraft, engine efficiency is dependent at least in part on the clearances between rotating and stationary components, such as rotating turbine blades and stationary shrouds. Generally, the tighter the clearances between the tips of the blades and the shrouds (i.e., the more closed the clearances), the more efficient the gas turbine engine can be operated. Thus, minimizing the blade tip clearances facilitates optimal engine performance and efficiency.

One challenge in minimizing the blade tip clearances is that the turbine blades expand and contract at different rates than the shrouds and casings circumferentially surrounding them when thrust demand is increased or decreased. Accordingly, conventionally, blade tip clearances have been left more open to account for engine bursts and accels, particularly during a cruise phase of a flight. Indeed, cruise clearances are typically sized such that the engine can perform a step climb without experiencing a turbine blade rub. Rub events may cause poor engine performance and efficiency, may reduce the effective service lives of the turbine blades and/or the shrouds, and may deteriorate the exhaust gas temperature margin of the engine. Thus, ideally, the blade tip clearances are set to minimize the clearance between the blade tips and the shrouds without the turbomachinery components experiencing rub events.

In some instances, the engine is controlled such that the rate of thrust increase of the engine is limited, particularly during cruise operation. This allows the clearances to be set more closed than they would be otherwise, and consequently, better engine efficiency can be achieved during cruise operation. However, limiting the rate of thrust increase of the engine decreases the responsiveness of the engine, which pilots and aircrew personnel may find undesirable.

Thus, a multi-spool turbomachine that addresses one or more of the challenges noted above would be useful. Moreover, an aerial vehicle having at least one multi-spool gas turbine engine that addresses one or more of the challenges noted above would be advantageous. Further, a method of operation of a multi-spool turbomachine that addresses one or more of the challenges noted above would be beneficial.

BRIEF DESCRIPTION

Aspects and advantages of the invention will be set forth in part in the following description, or may be obvious from the description, or may be learned through practice of the invention.

In one aspect, a vehicle is provided. The vehicle includes a gas turbine engine. The gas turbine engine includes a first rotatable component and a second rotatable component. The gas turbine engine also includes an electric machine operatively coupled with the first rotatable component and in communication with an electrical power source. The electric machine being operable to receive electrical power from the electrical power source. Further, the vehicle includes a computing system having one or more processors and one or more memory devices, the one or more memory devices storing instructions that when executed by the one or more processors cause the one or more processors to perform operations, in performing the operations, the one or more processors are configured to: receive an input indicating a change in a thrust demand to the gas turbine engine; and in response to the received input indicating the change in the thrust demand to the gas turbine engine, cause the electric machine to change an applied torque on the first rotatable component such that a rotational speed of the first rotatable component is changed.

In another aspect, a turbomachine for a vehicle is provided. The turbomachine includes a first rotatable component, a second rotatable component, and an electric machine operatively coupled with the first rotatable component. The turbomachine also includes a controller having one or more processors and one or more memory devices, the one or more memory devices storing instructions that when executed by the one or more processors cause the one or more processors to perform operations, in performing the operations, the one or more processors are configured to: receive an input indicating an increase in thrust demand to the turbomachine; and in response to the increase in the thrust demand to the turbomachine, cause the electric machine to apply torque to the first rotatable component.

In yet another aspect, a method is provided. The method includes receiving, by one or more computing devices, an input indicating an increase in thrust demand to a multi-spool turbomachine having a first spool and a second spool. In response to the received input indicating the increase in thrust demand to the multi-spool turbomachine, the method also includes causing, by the one or more computing devices, an electric machine operatively coupled with the first spool to increase a rotational speed of the first spool.

In another aspect, a non-transitory computer-readable medium is provided. The non-transitory computer-readable medium comprises computer-executable instructions, which, when executed by one or more processors of a computing system, cause the one or more processors to: receive an input indicating an increase in a thrust demand to a multi-spool turbomachine having a first rotatable component and a second rotatable component, such as a first spool and a second spool, respectively; and in response to the received input indicating the increase in the thrust demand to the multi-spool turbomachine, cause an electric machine operatively coupled with the first spool to increase a rotational speed of the first spool.

In some embodiments, when the computer-executable instructions are executed by the one or more processors of the computing system, the one or more processors cause the electric machine to increase the rotational speed of the first spool independent of the second spool.

In some embodiments, when the computer-executable instructions are executed by the one or more processors of the computing system, the one or more processors cause the electric machine to increase the rotational speed of the first spool such that the thrust demand is substantially met, and wherein the one or more processors cause fuel flow to the multi-spool turbomachine to increase over a first time period as electrical current flow to the electric machine is decreased over the first time period.

These and other features, aspects and advantages of the present subject matter will become better understood with reference to the following description and appended claims. The accompanying drawings, which are incorporated in and constitute a part of this specification, illustrate embodiments of the subject matter and, together with the description, explain the principles of the subject matter.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which.

DETAILED DESCRIPTION

Figure 1:
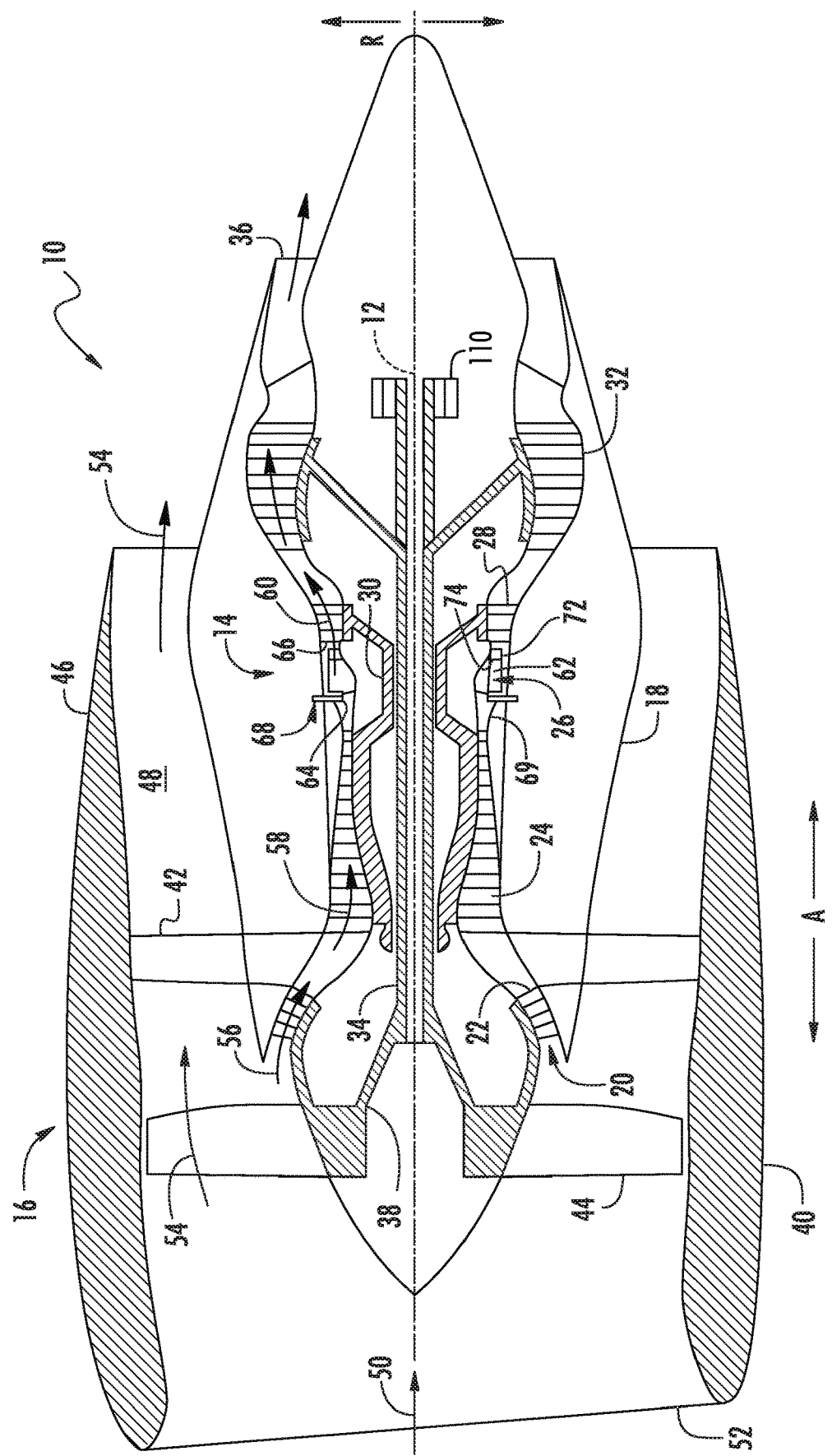
FIG. 1 provides a schematic cross-sectional view of an exemplary gas turbine engine in accordance with exemplary aspects of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows. Further, as used herein, the terms "axial" or "axially" refer to a dimension along a longitudinal axis of an engine. The term "forward" used in conjunction with "axial" or "axially" refers to a direction toward the engine inlet, or a component being relatively closer to the engine inlet as compared to another component. The term "rear" used in conjunction with "axial" or "axially" refers to a direction toward the engine nozzle, or a component being relatively closer to the engine nozzle as compared to another component. The terms "radial" or "radially" refer to a dimension extending between a center longitudinal axis of the engine and an outer engine circumference. Furthermore, as used herein, terms of approximation, such as "approximately," "substantially," or "about," refer to being within a fifteen percent (15%) margin of error unless otherwise stated.

Generally, the present disclosure is directed to a multi-spool turbomachine having an electric machine that can be controlled to input power to one of the spools of the turbomachine. In one aspect, the multi-spool turbomachine can be a hybrid electric gas turbine engine for an aircraft. The hybrid electric gas turbine engine can include a first spool rotatable about a first axis of rotation and a second spool rotatable about a second axis of rotation, which can be the same or different as the first axis of rotation. The first spool can be a low pressure spool and the second spool can be a high pressure spool in some embodiments. In other embodiments, the first spool can be a high pressure spool and the second spool can be a low pressure spool. The electric machine is or is operable as an electric motor. The electric motor can receive electrical power from an electrical power source, such as one or more batteries and/or an auxiliary power unit. The electric machine is operatively coupled with the first spool. When the electric machine receives electrical power from the electrical power source, the electric machine applies a torque to the first spool, which causes the rotational speed of the first spool to change.

In response to a thrust demand increase (e.g., an engine burst), one or more processors of a computing system can cause the electric machine to apply torque to the first spool. In some embodiments, the electric machine can initially be caused to meet all or some percentage of the increase in thrust demand. Electric current can be supplied to the electric machine nearly instantaneously or at a predefined rate in response to the thrust demand increase. The applied torque on the first spool by the electric machine causes the first spool to "spool up" or increase in rotational speed. Fuel input to a combustor of the multi-spool turbomachine can be increased or ramped up gradually while the torque applied by the electric machine on the first spool can be decreased or ramped down over a time period. Accordingly, the usage of the electric machine can be ramped down so that the fuel input can eventually meet the demanded thrust increase without use of the electric machine. In this way, the electric machine can electrically assist the engine in meeting thrust demand whilst reducing the rotor expansion of the second spool and rate-limiting the increase in rotational speed of the second spool. Thus, the engine can respond to the increase in thrust demand without causing turbomachinery rub events.

Moreover, advantageously, by utilizing an electric machine to assist with meeting demanded thrust during an engine accel or burst, the engine can be operated in cruise operations such that a compressor of the gas turbine engine (e.g., a high pressure compressor) is operated closer to a stall line as less headroom or stall margin is required to account for acceleration of the second or high pressure spool. Operating the compressor closer to the stall line provides increased pressure ratios, which equates to a reduction in fuel burn. Accordingly, utilizing the electric machine for electrical assistance during cruise operations can provide increased thermal efficiency during cruise operations whilst protecting the engine from stall under all conditions.

In other embodiments, in response to a thrust demand increase, a computing system can cause the electric machine to apply torque to the first spool. Particularly, the computing system can cause the electric machine to meet all of the increase in thrust demand, and in such embodiments, the electric machine can continue meeting the increase in thrust demand without any additional fuel input. For instance, in some embodiments, particularly during cruise operation, the fuel input can be limited to a predefined fuel input threshold. In such embodiments, if the fuel input reaches or is at the predefined fuel input threshold and an increase in thrust demand is requested, the increased thrust demand can be met entirely by the electric machine. When the fuel input drops below the predefined fuel input threshold, fuel can be input into the gas turbine engine (e.g., a combustor thereof) and the electric machine can be used for electrical assistance in meeting the increase in thrust demand. In some embodiments, the predefined fuel input threshold is set based on one or more operating conditions associated with the engine and/or aerial vehicle. For instance, the predefined fuel input threshold can be varied based on, without limitation, the altitude of the aircraft, the airspeed or Mach number of the aircraft, the ambient temperature, the electrical energy stored in the electrical power source, the amount of fuel remaining, the weight of the aircraft, a combination thereof, and/or other flight/engine conditions, etc.

In other embodiments, in response to a thrust demand decrease (e.g., an engine deceleration), one or more processors of a computing system can cause the electric machine to change the applied torque on the first spool. In such embodiments, the one or more processors can cause the electric machine to change the applied torque on the first rotatable component. When the one or more processors cause the electric machine to decrease the torque on the first rotatable component, or cause the electric machine to act as a generator to apply a drag torque on the first rotatable component, the rotational speed of the first rotatable component is decreased. In this manner, the turbomachine can decelerate more rapidly. As noted, the one or more processors can 1) cause the electric machine to apply less torque on the first rotatable component when the electric machine is functioning as an electric motor, e.g., to decrease the rotational speed of the first rotatable component; and/or 2) cause the electric machine to function as a generator to apply a drag or counter torque on the first rotatable component to decrease the rotational speed of the first rotatable component. Using at least one of the methods, the rotational speed of the first rotatable component can be instantaneously or nearly instantaneously decreased.

FIG. 1 provides a schematic cross-sectional view of an exemplary turbomachine as may incorporate various embodiments of the present disclosure. Particularly, FIG. 1 provides an aviation high-bypass turbofan engine herein referred to as "turbofan 10". The turbofan 10 of FIG. 1 can be mounted to an aerial vehicle, such as a fixed-wing aircraft, and can produce thrust for propulsion of the aerial vehicle. For reference, the turbofan 10 defines an axial direction A, a radial direction R, and a circumferential direction. Moreover, the turbofan 10 defines an axial centerline or longitudinal axis 12 that extends therethrough for reference purposes. In general, the axial direction A extends parallel to the longitudinal axis 12, the radial direction R extends outward from and inward to the longitudinal axis 12 in a direction orthogonal to the axial direction A, and the circumferential direction extends three hundred sixty degrees (360°) around the longitudinal axis 12.

The turbofan 10 includes a core gas turbine engine 14 and a fan section 16 positioned upstream thereof. The core engine 14 includes a tubular outer casing 18 that defines an annular core inlet 20. The outer casing 18 further encloses and supports a booster or low pressure compressor 22 for pressurizing the air that enters core engine 14 through core inlet 20. A high pressure, multi-stage, axial-flow compressor 24 receives pressurized air from the LP compressor 22 and further increases the pressure of the air. The pressurized air stream flows downstream to a combustor 26 where fuel is injected into the pressurized air stream and ignited to raise the temperature and energy level of the pressurized air. The high energy combustion products flow from the combustor 26 downstream to a high pressure turbine 28 for driving the high pressure compressor 24 through a high pressure spool 30 or a second rotatable component. The high energy combustion products then flow to a low pressure turbine 32 for driving the LP compressor 22 and the fan section 16 through a low pressure spool 34 or a first rotatable component. The LP spool 34 is coaxial with the HP spool 30 in this example embodiment. After driving each of the turbines 28 and 32, the combustion products exit the core engine 14 through an exhaust nozzle 36 to produce propulsive thrust.

The fan section 16 includes a rotatable, axial-flow fan rotor 38 that is surrounded by an annular fan casing 40. The fan casing 40 is supported by the core engine 14 by a plurality of substantially radially-extending, circumferentially-spaced outlet guide vanes 42. In this way, the fan casing 40 encloses the fan rotor 38 and a plurality of fan blades 44. A downstream section 46 of the fan casing 40 extends over an outer portion of the core engine 14 to define a bypass passage 48. Air that passes through the bypass passage 48 provides propulsive thrust as will be explained further below. In some alternative embodiments, the LP spool 34 may be connected to the fan rotor 38 via a speed reduction device, such as a reduction gear gearbox in an indirect-drive or geared-drive configuration. Such speed reduction devices can be included between any suitable shafts/spools within the turbofan 10 as desired or required.

During operation of the turbofan 10, an initial or incoming airflow, represented by arrow 50, enters the turbofan 10 through an inlet 52 defined by the fan casing 40. The airflow 50 passes through the fan blades 44 and splits into a first air flow (represented by arrow 54) that moves through the bypass passage 48 and a second air flow (represented by arrow 56) which enters the LP compressor 22 through the core inlet 20.

The pressure of the second airflow 56 is progressively increased by the LP compressor 22 and then enters the HP compressor 24, as represented by arrow 58. The discharged pressurized air stream flows downstream to the combustor 26 where fuel is introduced to generate combustion gases or products. The combustion products 60 exit the combustor 26 and flow through the HP turbine 28. The combustion products 60 then flow through the LP turbine 32 and exit the exhaust nozzle 36 to produce thrust. Moreover, as noted above, a portion of the incoming airflow 50 flows through the bypass passage 48 and through an exit nozzle defined between the fan casing 40 and the outer casing 18 at the downstream section 46 of the fan casing 40. In this way, substantial propulsive thrust is produced.

As further shown in FIG. 1, the combustor 26 defines an annular combustion chamber 62 that is generally coaxial with the longitudinal centerline axis 12, as well as an inlet 64 and an outlet 66. The combustor 26 receives an annular stream of pressurized air from a high pressure compressor discharge outlet 69. A portion of this compressor discharge air ("CDP" air) flows into a mixer (not shown). Fuel is injected from a fuel nozzle 68 to mix with the air and form a fuel-air mixture that is provided to the combustion chamber 62 for combustion. Ignition of the fuel-air mixture is accomplished by a suitable igniter, and the resulting combustion gases 60 flow in an axial direction A toward and into an annular, first stage turbine nozzle 72. The nozzle 72 is defined by an annular flow channel that includes a plurality of radially-extending, circumferentially-spaced nozzle vanes 74 that turn the gases so that they flow angularly and impinge upon the first stage turbine blades of the HP turbine 28. For this embodiment, the HP turbine 28 rotates the HP compressor 24 via the HP spool 30 and the LP turbine 32 drives the LP compressor 22 and the fan rotor 38 via the LP spool 34.

Notably, for this embodiment, turbofan 10 is an aeronautical electric hybrid propulsion machine. Particularly, turbofan 10 includes one or more electric machines operable to provide operation and control assistance to the multi-spool turbofan 10. For the depicted embodiment of FIG. 1, turbofan 10 includes an electric machine 110 operatively coupled with the LP spool 34. Although the electric machine 110 is operatively coupled with the LP spool 34 at an aft end of the LP spool 34, the electric machine 110 can be mounted to the LP spool 34 at any suitable location. As will be explained herein, the electric machine 110 can be controlled to apply torque to the LP spool 34 to increase the rotational speed of the LP spool 34 independent of the HP spool 30, e.g., during an engine burst. Stated another way, the electric machine 110 can be controlled to electrically assist the LP spool 34 in increasing its rotational speed to ultimately change the thrust output of the turbofan 10. The electric machine 110 can be controlled to electrically assist the LP spool 34 during transient operation, such as during a burst or accel in cruise phase of a flight. The manner in which the electric machine 110 can be utilized to electrically assist the LP spool 34 will be described in more detail herein.

Although turbofan 10 has been described and illustrated in FIG. 1 as representing an example hybrid turbomachine, the subject matter of the present disclosure may apply to or be incorporated with other suitable types of multi-spool turbomachines. For instance, the subject matter of the present disclosure may apply to or be incorporated with other suitable turbine engines, such as steam and other gas turbine engines. Example gas turbine engines may include turbojets, turboprop, turboshaft, aeroderivatives, auxiliary power units, etc. In addition, the subject matter of the present disclosure may apply to turbomachines having more than two spools. For instance, the inventive aspects of the present disclosure can apply to a gas turbine engine for an aerial vehicle having a high pressure spool, an intermediate pressure spool, and a low pressure spool. As will be explained herein, an electric machine can be operatively coupled to the low pressure spool and can be controlled to apply a torque thereto, e.g., to increase the rotational speed of the low pressure spool independent of the other spools. The rotational speed of the intermediate and high pressure spools can be controlled or regulated as described herein, e.g., via increased fuel inputs when increased thrust is demanded.

Figure 2:
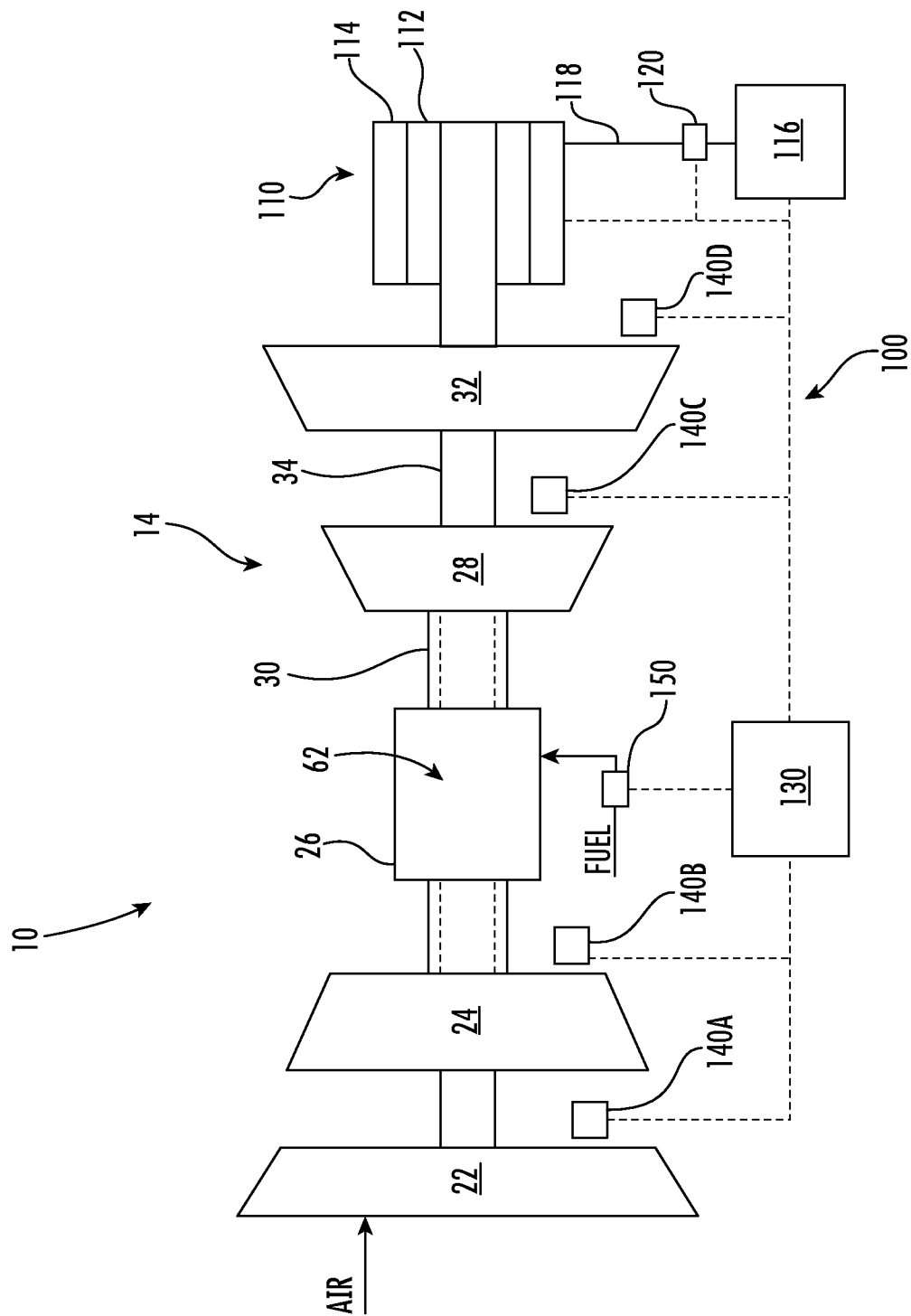
FIG. 2 provides a schematic view of the gas turbine engine of FIG. 1 and depicts an electrical system in communication with the gas turbine engine.

FIG. 2 provides a schematic view of the core turbine engine 14 of the turbofan 10 of FIG. 1 and depicts a control system 100 operable to control the turbofan 10 and the electric machine 110 thereof. The electric machine 110 is a component of the control system 100. In some embodiments, all of the components of the control system 100 are onboard the turbofan 10. In other embodiments, some of the components of the control system 100 are onboard the turbofan 10 and some are offboard the turbofan 10. For instance, some of the offboard components can be mounted to a wing, fuselage, or other suitable structure of an aerial vehicle to which the turbofan 10 is mounted.

As shown, the electric machine 110 is operatively coupled with the first or LP spool 34. For instance, in the depicted embodiment of FIG. 2, the electric machine 110 is directly operatively coupled to the LP spool 34. In other embodiments, the electric machine 110 can be indirectly coupled with the LP spool 34. For instance, the electric machine 110 can be connected to a shaft that is in turn operatively coupled with the LP spool 34. For example, the electric machine 110 can be operatively coupled with a shaft that is operatively coupled with the LP spool 34 via a gearbox and/or other speed reduction device.

The electric machine 110 includes a rotor 112 and a stator 114. The rotor 112 operatively couples the electric machine 110 with the LP spool 34 and rotates within the stator 114 about an axis of rotation. In some embodiments, the electric machine 110 can operate as an electric motor to drive the LP spool 34 or as an electric generator to generate electrical power utilizing the rotational energy of the LP spool 34. In other embodiments, the electric machine 110 can operate solely as an electric motor. When the electric machine 110 operates as an electric motor and electrical power is directed thereto, the rotor 112 is driven by an interaction between windings and/or magnetic fields of the rotor 112 and stator 114 as will be appreciated by those of skill in the art. The rotation of the rotor 112 causes the electric machine 110 to apply torque to the LP spool 34. That is, rotation of the rotor 112 relative to the stator 114 causes the electric machine 110 to input power to the LP spool 34 such that a rotational speed of the LP spool 34 is changed (e.g., increased). In this way, the rotational speed of the LP spool 34 can be changed (e.g., increased) independent of the second or HP spool 30.

The control system 100 also includes an electrical power source 116. The electric machine 110 is in communication with the electrical power source 116, e.g., via a power bus 118. The electric machine 110 is configured to receive electrical power from the electrical power source 116. The electrical power source 116 can be any suitable power source. For example, the electrical power source 116 can be, without limitation, one or more energy storage devices (e.g., one or more batteries), an electric generator operatively coupled with another turbomachine of the aerial vehicle to which the turbofan 10 is mounted, an auxiliary power unit (APU) of the aerial vehicle to which the turbofan 10 is mounted, some combination thereof, etc. The electrical power source 116 can be located onboard the turbofan 10. As one example, the electrical power source 116 can be mounted to the fan casing 40 (FIG. 1). As another example, the electrical power source 116 can be mounted to a nacelle covering the fan casing 40 (not shown in FIG. 1). In other embodiments, the electrical power source 116 can be mounted or positioned offboard of the turbofan 10. For instance, the electrical power source 116 can be positioned in a suitable location onboard the aerial vehicle to which the turbofan 10 is mounted, e.g., onboard a wing or the fuselage of the aerial vehicle.

The control system 100 can include one or more power management electronics or electrical control devices 120, such as inverters, converters, rectifiers, devices operable to control the flow of electrical current, etc. For instance, one or more of the control devices 120 can be operable to condition and/or convert electrical power (e.g., from AC to DC or vice versa). Further, one or more of the control devices 120 can be operable to control the electrical power provided to the electric machine 110 by the power source 116. Although, the control devices 120 are shown schematically in FIG. 2 as separate from the electrical power source 116 and from the electric machine 110, it will be appreciated that one, some, or all of control devices 120 can be located onboard the electrical power source 116 and/or the electric machine 110.

The turbofan 10 includes a computing system. Particularly, for this embodiment, the turbofan 10 includes a computing system having one or more computing devices, including a controller 130 configured to control the turbofan 10, and in this embodiment, the electric machine 110 and other components of the control system 100. The controller 130 can include one or more processor(s) and associated memory device(s) configured to perform a variety of computer-implemented functions and/or instructions (e.g., performing the methods, steps, calculations and the like and storing relevant data as disclosed herein). The instructions, when executed by the one or more processors, can cause the one or more processor(s) to perform operations, such as electrically assisting the LP spool 34 during engine bursts or accels.

Additionally, the controller 130 can include a communications module to facilitate communications between the controller 130 and various components of the aerial vehicle 200 and other electrical components of the hybrid electric turbofan 10. The communications module can include a sensor interface (e.g., one or more analog-to-digital converters) to permit signals transmitted from the one or more sensors to be converted into signals that can be understood and processed by the one or more processor(s). It should be appreciated that the sensors can be communicatively coupled to the communications module using any suitable means. For example, the sensors can be coupled to the sensor interface via a wired connection. However, in other embodiments, the sensors can be coupled to the sensor interface via a wireless connection, such as by using any suitable wireless communications protocol. As such, the processor(s) can be configured to receive one or more signals or outputs from the sensors, such as one or more operating conditions/parameters.

As used herein, the term "processor" refers not only to integrated circuits referred to in the art as being included in a computing device, but also refers to a controller, a microcontroller, a microcomputer, a programmable logic controller (PLC), an application specific integrated circuit, and other programmable circuits. The one or more processors can also be configured to complete the required computations needed to execute advanced algorithms. Additionally, the memory device(s) can generally include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) can generally be configured to store suitable computer-readable instructions that, when implemented by the processor(s), configure the controllers 130 to perform the various functions described herein. The controller 130 can be configured in substantially the same manner as the exemplary computing device of the computing system 500 described below with reference to FIG. 14 (and may be configured to perform one or more of the functions of the exemplary method (400) described herein).

The controller 130 may be a system of controllers or a single controller. The controller 130 may be a controller dedicated to control of the electric machine 110 and associated electrical components or can be an engine controller configured to control the turbofan 10 as well as the electric machine 110 and its associated electrical components. The controller 130 can be, for example, an Electronic Engine Controller (EEC) or an Electronic Control Unit (ECU) of a Full Authority Digital Engine Control (FADEC) system.

The turbofan 10 also includes one or more sensors for sensing and/or monitoring various engine operating conditions and/or parameters during operation. For instance, one or more sensors 140A can be positioned at the LP compressor 22, one or more sensors 140B can be positioned at the HP compressor 24, one or more sensors 140C can be positioned at the HP turbine 28, and one or more sensors 140D can be positioned at the LP turbine 32, among other possible locations. The sensors 140A, 140B, 140C, 140D can sense or measure various engine conditions, e.g., pressures and temperatures, and one or more signals may be routed from the one or more sensors 140A, 140B, 140C, 140D to the controller 130 for processing. Accordingly, the controller 130 is communicatively coupled with the one or more sensors 140A, 140B, 140C, 140D, e.g., via a suitable wired or wireless communication link. It will be appreciated that the turbofan 10 can include other sensors at other suitable stations along the core air flowpath.

The turbofan 10 can also include one or more fuel control devices operable to control fuel flow to the turbofan 10, and more particularly to the combustion chamber 62 of the combustor 26. For instance, a fuel control device 150 is shown in FIG. 2 controlling fuel flow to the combustor 26. The fuel control device 150 is communicatively coupled with the controller 130, e.g., via a suitable wired or wireless communication link.

Figure 3:
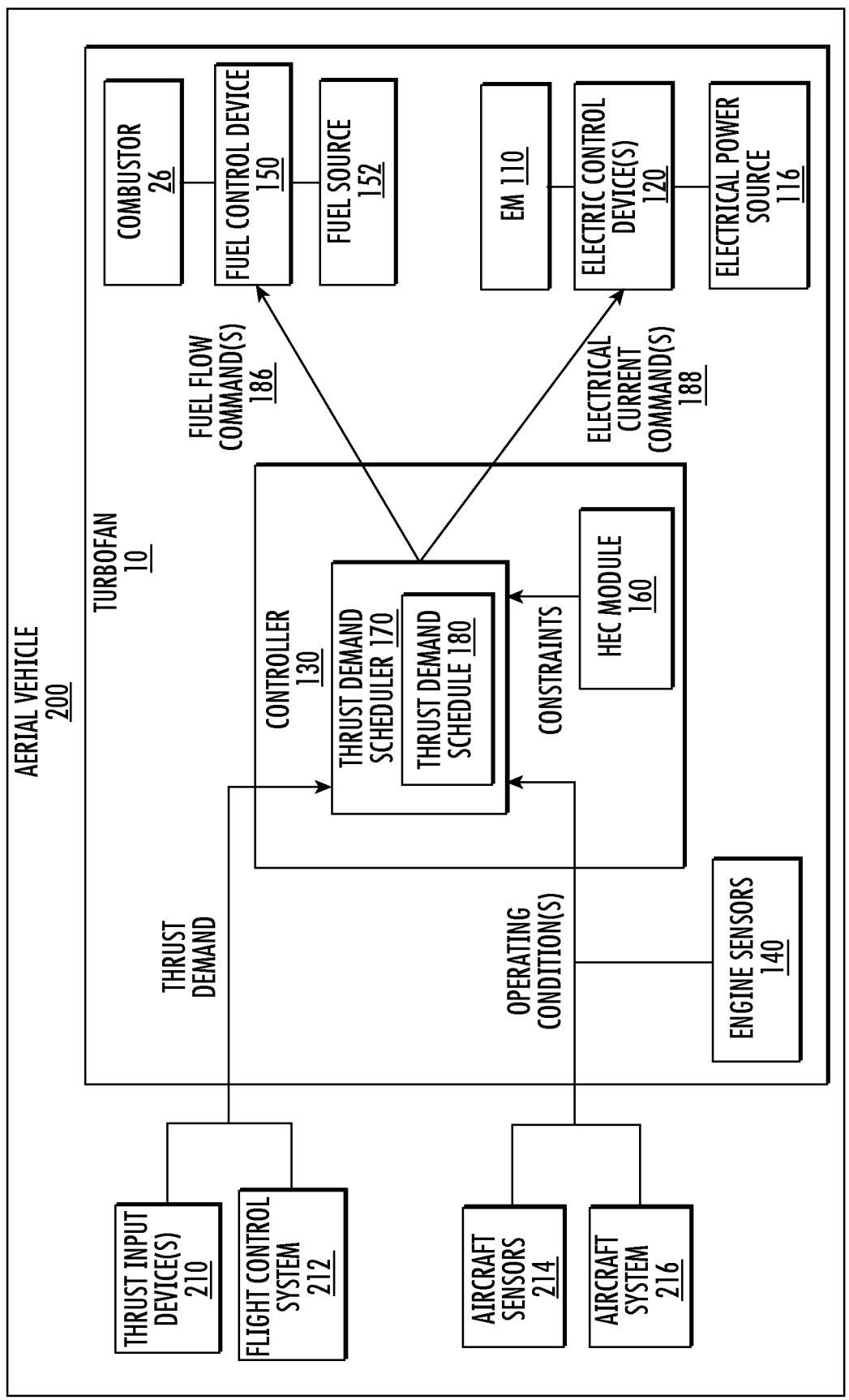
FIG. 3 provides a block diagram of a control system for controlling the gas turbine engine of FIGS. 1 and 2.

FIG. 3 provides a block diagram of the control system 100 operable to control operation of the hybrid electric turbofan 10. The hybrid electric turbofan 10 is operable to produce propulsive thrust for an aerial vehicle 200 to which the hybrid electric turbofan 10 is mounted. As noted above, the control system 100 can include one or more devices, such as sensors, controllers, processors, memory devices, controllable devices, electric machines, etc. that can monitor and control various aspects of the hybrid electric turbofan 10. Particularly, the electric machine 110 of the control system 100 can be controlled to input power to the LP spool 34, e.g., during an engine burst. For instance, a computing system (e.g., controller 130) can receive an input indicating a change in thrust demand to the hybrid electric turbofan 10, and in response to the received input indicating the change in thrust demand to the hybrid electric turbofan 10, the computing system can cause the electric machine 110 to apply torque to the LP spool 34 such that a rotational speed of the LP spool 34 is changed. In this way, the electric machine 110 can electrically assist the turbofan 10 in meeting the demanded thrust. Advantageously, the electric machine 110 can provide electrical assistance i) during bursts to reduce rotor expansion of the HP turbine 28 (FIGS. 1 and 2); ii) during bursts to rate-limit the core speed; and iii) generally during engine operation such that the engine can safely run closer to its stall line, thereby improving engine efficiency and a corresponding reduction in fuel burn. Various features of the control system 100 and an example manner in which the electric machine 110 can provide electric assistance to the turbofan 10 to meet the demanded thrust will be described below.

As depicted in FIG. 3, a computing system of the aerial vehicle 200 (e.g., the controller 130) can receive one or more inputs indicating a change in a thrust demand to the hybrid electric turbofan 10. The one or more inputs can be in the form of analog or digital electrical signals, for example. The change in thrust demand can be an increase in thrust demand or a decrease in thrust demand. The controller 130 can receive the one or more inputs in response to a user input or automatically based on commands from a flight control system.

For instance, as illustrated in FIG. 3, the aerial vehicle 200 can include one or more thrust input devices 210, such as power or thrust levers movable by a user (e.g., a pilot). By moving the thrust input device 210, a pilot can change (e.g., increase or decrease) the thrust demanded of the hybrid electric turbofan 10. For instance, to perform a step climb during cruise operation, a pilot can move the thrust input device 210 to increase the power level and consequently the thrust demand to the hybrid electric turbofan 10. In this manner, the aerial vehicle 200 can better perform the step climb. In some embodiments, the one or more thrust input devices 210 can be located offboard of the aerial vehicle 200, such as would be the case for an Unmanned Aerial Vehicle (UAV) of an Unmanned Aircraft System (UAS). Further, in some embodiments, the aerial vehicle 200 can include a flight control system 212 (e.g., an autopilot system) operable to automatically change the thrust demand to the hybrid electric turbofan 10.

The computing system of the aerial vehicle 200 (e.g., the controller 130) can also receive one or more inputs indicative of one or more operating conditions of the hybrid electric turbofan 10 and/or aerial vehicle 200. The controller 130 can receive the one or more inputs from one or more sensors, from control logic operable to calculate parameters/conditions based at least in part on the received sensor outputs, and/or using one or more models. For example, the controller 130 can receive the one or more inputs from the engine sensors 140 (that can include one or more of the sensors 140A, 140B, 140C, 140D of FIG. 3), aircraft sensors 214 of the aerial vehicle 200, and/or aircraft systems 216 (e.g., a flight management system) of the aerial vehicle 200.

Example operating conditions that can be sensed, calculated, and/or modeled include an altitude of the aerial vehicle 200, an ambient temperature, an exhaust gas temperature, a compressor discharge temperature, an inlet low pressure compressor temperature, a specific fuel consumption, an engine efficiency, an angle of attack of the aerial vehicle 200, a Mach number, a thrust, an airspeed, a fan flow, a core flow, a current electrical current draw of the electric machine 110, a fan speed, a core speed, an engine inlet pressure, a bypass passage pressure, an inlet high pressure compressor pressure, a compressor discharge pressure, a high pressure turbine pressure, an accelerometer measurement, a flight control position, and/or one or more waypoints of a mission (e.g., the origin, the destination, and one or more points therebetween).

In some embodiments, as noted above, the one or more operating conditions can include an altitude at which the hybrid electric turbofan 10 is operating, or stated differently, the operating conditions can include an altitude of the aerial vehicle 200. The controller 130 can advantageously utilize an input indicative of the altitude of the aerial vehicle 200 to better determine the thrust demand schedule (e.g., the fuel input/electrical current input split) for controlling the hybrid electric turbofan 10 during an engine burst. As will be appreciated, generally, the density of the air at higher altitudes is less than at lower altitudes, and hence there is less oxygen in the air at higher altitudes. Accordingly, electric machines can better compete with the thrust output of a turbomachine at higher altitudes as electric machines are unaffected by air density. In this manner, the thrust demand schedule can be determined based at least in part on the altitude. For instance, at higher altitudes, the electric machine 110 can be utilized to meet more of the thrust demand than at lower altitudes where the turbofan 10 is more effective at meeting the thrust demand. The thrust demand schedule can be determined accordingly.

The computing system of the aerial vehicle 200 (e.g., the controller 130) can also receive one or more inputs indicative of one or more constraints, or more particularly, one or more thrust rate limiting constraints. For instance, as depicted in FIG. 3, the controller 130 can include a High-Efficiency Cruise (HEC) module 160. The HEC module 160 is configured to store blade tip clearance schedules, that when implemented, facilitate high-efficiency cruise operation of the aerial vehicle 200. Particularly, in implementing the blade tip clearance schedules, the blade tip clearances can be kept more closed or tighter than they would be otherwise. The HEC module 160 also includes thrust rate limiting schedules, that when implemented, cause the controller 130 to restrict the thrust increase rate of the aerial vehicle 200 during the cruise phase of a flight (e.g., due to the relatively tight or closed clearances set by the blade tip clearance schedules). Stated another way, the thrust rate limiting schedules, when implemented, prevent the HP spool 30 from accelerating (i.e., increasing in rotational speed) past a predefined rate. In this manner, the risk of the blade tips rubbing against the shrouds during a step climb or other acceleration maneuver during cruise phase is reduced or eliminated. Thrust rate limiting schedules can be received by the controller 130 as inputs. In some embodiments, the thrust rate limiting schedules forwarded to the controller 130 can be based at least in part on the received inputs indicative of the operating conditions of the hybrid electric turbofan 10 and/or aerial vehicle 200.

In addition to receiving the thrust rate limiting schedule(s) from the HEC module 160, other thrust rate limiting constraints can be received. For instance, the thrust rate limiting constraints can be indicative of a pressure ratio range in which the hybrid electric turbofan 10 must stay within during the acceleration maneuver. In other embodiments, the thrust rate limiting constraints can be indicative of a stall margin that the hybrid electric turbofan 10 must maintain during the acceleration maneuver.

Figure 4:
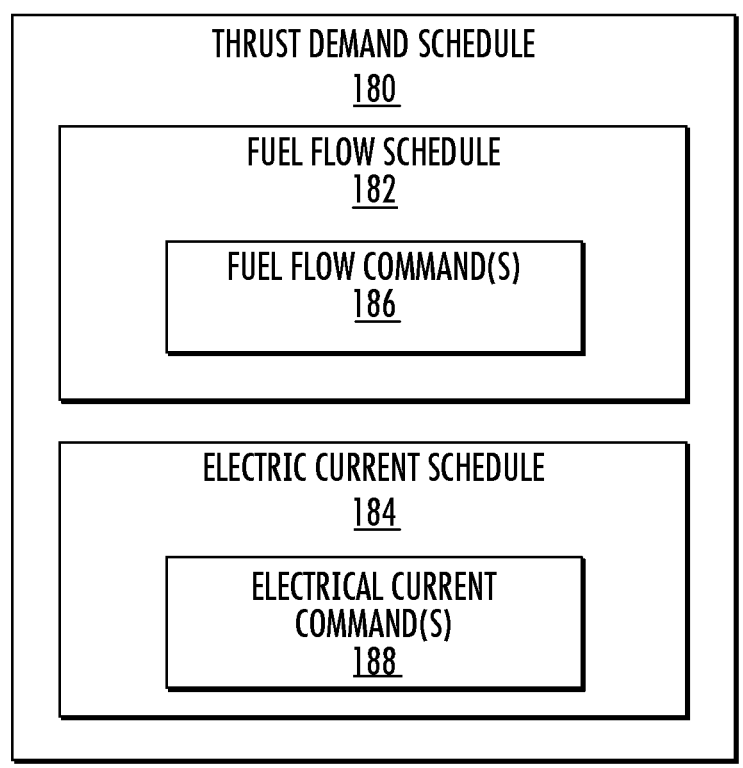
FIG. 4 provides a block diagram of an example thrust demand schedule in accordance with exemplary aspects of the present disclosure.
Figure 5:
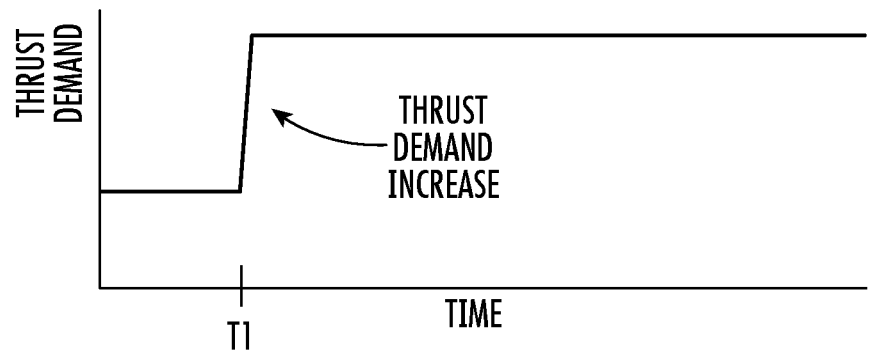
FIG. 5 provides a graph depicting thrust demand over a first time period in accordance with exemplary aspects of the present disclosure.

For this embodiment, the computing system of the aerial vehicle 200 (e.g., the controller 130) includes a thrust demand scheduler 170 operable to determine or generate a thrust demand schedule 180 in response to one or more inputs received by the controller 130. Particularly, as depicted in FIG. 4, the thrust demand schedule 180 determined by the thrust demand scheduler 170 sets forth a schedule of fuel flow to the turbofan 10 over a time period and a schedule of electrical current flow to the electric machine 110 over the time period. Stated another way, the thrust demand schedule 180 includes a fuel flow schedule 182 and an electric current schedule 184. The thrust demand schedule 180 is determined by the thrust demand scheduler 170 so that, when the schedule is implemented, the thrust demand is met or substantially met.

The one or more processors of the computing system (e.g., the controller 130) can control fuel flow to the turbofan 10 over the time period based at least in part on the determined schedule of fuel flow to the turbofan 10 (i.e., the fuel flow schedule 182) and control electrical current flow to the electric machine 110 over the time period based at least in part on the determined schedule of electrical current flow to the electric machine 110 (i.e., the electric current schedule 184). The fuel flow schedule 182 can include one or more fuel flow commands 186 and the electric current schedule 184 can include one or more electrical current commands 188.

As depicted in FIG. 3, the fuel flow commands 186 can be routed from the controller 130 to the fuel control device 150. By routing the fuel flow commands 186 to the fuel control device 150, the controller 130 can cause the fuel control device 150 to control fuel flow to the turbofan 10 (e.g., the combustor 26) based at least in part on the one or more fuel flow control commands 186. That is, the fuel control device 150 can control the mass flow rate of fuel flowing from a fuel source 152 (e.g., a fuel tank filled with fuel) downstream to the combustor 26, which ultimately controls the thrust output of the turbofan 10, as increased fuel input to the turbofan 10 increases the thrust output and a decrease in fuel input to the turbofan 10 decreases the thrust output thereof.

Similarly, as shown in FIG. 3, the electric current commands 188 can be routed from the controller 130 to the electrical control device(s) 120. By routing the electric current commands 188 to the electrical control device(s) 120, the controller 130 can cause the electrical control device(s) 120 to control electrical current flow to the electric machine 110 based at least in part on the one or more electric current commands 188. That is, the electrical control device (s) 120 can control the amperage of electric current flowing from the electrical power source 116 to the electric machine 110, which ultimately controls the thrust output of the turbofan 10. Particularly, increased electric current input to the electric machine 110 increases the torque applied by the electric machine 110 on the LP shaft 34, which increases the thrust output of the turbofan 10 (assuming all other variables remain the same, such as fuel input). Conversely, decreased electric current delivered to the electric machine 110 decreases the torque applied by the electric machine 110 on the LP shaft 34, which decreases the thrust output of the turbofan 10 (assuming all other variables remain the same).

In some embodiments, the schedule 180 is set so that, when the schedule 180 is implemented, the increase in demanded thrust is met at least in part by torque applied to the LP shaft 34 by the electric machine 110. Stated another way, in response to an increase in demanded thrust, the thrust output of the turbofan 10 can be increased at least in part by the application of torque on the LP shaft 34 by the electric machine 110. In some embodiments, electrical current can be supplied to the electric machine 110 nearly instantaneously in response to an increase in thrust demand. In other embodiments, electrical current can be supplied to the electric machine 110 at a predefined rate or as a function of one or more operating conditions or constraints in response to an increase in thrust demand. Further, in some embodiments, the electric machine 110 can apply torque on the LP shaft 34 to account for a percentage of the increase in thrust demand and the remaining percentage can be achieved by other means, such as by supplying fuel to the turbofan 10. For example, the electric machine 110 can be controlled to apply torque on the LP shaft 34 to account for fifty percent (50%) of the change in thrust demand and the remaining percentage can be accounted for by increased fuel flow to the combustor 26 of the turbofan 10. It will be appreciated that the electric machine 110 can be controlled to apply torque on the LP shaft 34 to account for any predefined percentage of the change in thrust demand.

In some example embodiments, the schedule 180 is set so that, when the schedule 180 is implemented, the one or more processors of the computing system (e.g., controller 130) initially control the electrical current flow to the electric machine 110 such that the electric machine 110 applies a predefined maximum torque (e.g., a maximum allowable torque the electric machine 110 is operable to output) on the LP shaft 34 to meet or account at least in part for the increase in demanded thrust. As noted above, the predefined maximum torque applied to the LP shaft 34 by the electric machine 110 may only account for a percentage of the increase in thrust demand. For example, the predefined maximum torque applied on the LP shaft 34 by the electric machine 110 may account for seventy-five percent (75%) of the increase in thrust demand. After initially causing the electric machine 110 to apply the predefined maximum torque or some torque that is less than the predefined maximum torque on the LP shaft 34, over a time period (e.g., on the order of several seconds), the application of torque applied to the LP shaft 34 by the electric machine 110 is decreased (e.g., ramped down in linear or step-wise manner) as the fuel input to the turbofan 10 is increased (e.g., ramped up gradually). In this manner, the turbofan 10 may be more responsive to the increase in thrust demand (e.g., due to the assistance of the electric machine 110), the thrust demand increase can be met or substantially met faster compared to conventional systems, and due to the gradual fuel input over time, rotating components and adjacent stationary components can remain thermally matched during the thrust change (i.e., a safe clearance is maintained therebetween). Thus, the rotating components are prevented form rubbing against their respective adjacent stationary components.

In some other example embodiments, the schedule 180 is set so that, when the schedule 180 is implemented, the increase in demanded thrust is initially met or substantially met by torque applied to the LP shaft 34 by the electric machine 110. The applied torque can be the same or less than the predefined maximum torque. After initially meeting or substantially meeting the increase in thrust demand, over a time period, the application of torque applied to the LP shaft 34 by the electric machine 110 is decreased (e.g., ramped down in linear or step-wise manner) as the fuel input to the turbofan 10 is increased (e.g., ramped up gradually). That is, the one or more processors of the computing system (e.g., controller 130) initially control the electric current flow to the electric machine 110 such that the electric machine 110 applies torque to the LP shaft 34 to account for all or nearly all of the increase in demanded thrust. The one or more processors of the computing system then control fuel flow to the combustor 26 of the turbofan 10 and control electrical current flow to the electric machine 110 over the first period of time such that fuel flow to the combustor 26 of the turbofan 10 is gradually ramped up and electrical current flow to the electric machine 110 is ramped down over the time period. In this manner, in a similar manner noted above, the turbofan 10 may be more responsive to the increase in thrust demand (e.g., due to the assistance of the electric machine 110), the thrust demand increase can be met or substantially met faster compared to conventional systems, and due to the gradual fuel input over time, rotating components and adjacent stationary components can remain thermally matched during the thrust change (i.e., a safe clearance is maintained therebetween). Thus, the rotating components are prevented form rubbing against their respective adjacent stationary components.

Figure 6:
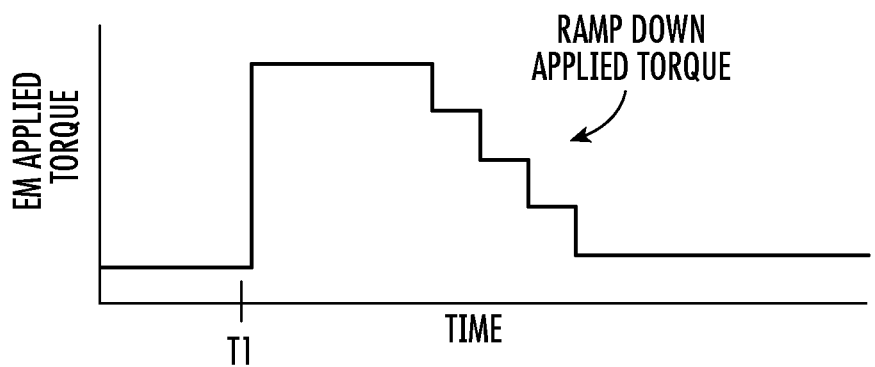
FIG. 6 provides a graph depicting electric machine applied torque over the first time period.
Figure 7:
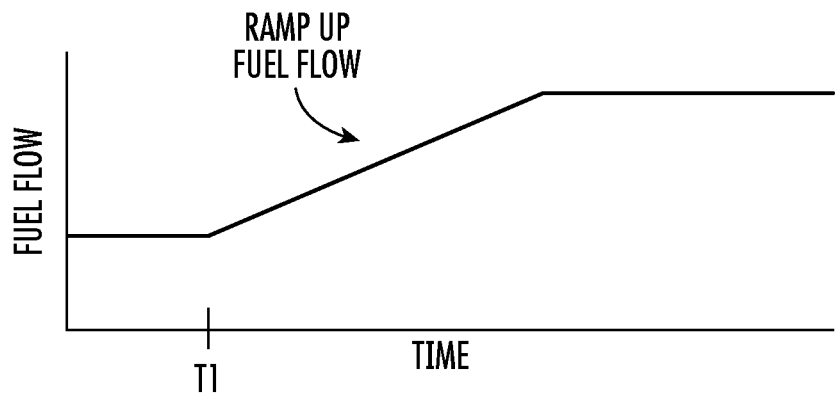
FIG. 7 provides a graph depicting fuel flow to a gas turbine engine over the first time period.

By way of example, with reference now to FIGS. 3, 5, 6, and 7, FIG. 5 provides a graph depicting thrust demand over a first time period, FIG. 6 provides a graph depicting electric machine applied torque over the first time period, and FIG. 7 provides a graph depicting fuel flow to the turbofan 10 over the first time period. At time t1, a pilot provides a user input requesting an increase in thrust. For instance, a pilot can provide a user input to thrust input device 210. For example, the pilot can move the thrust input device 210 to demand additional thrust, e.g., for performing a step climb. In response to the user input, or alternatively to an automatic thrust demand, the thrust demand scheduler 170 of the controller 130 receives an input indicating an increase in thrust demand to the turbofan 10.

In response to the received input indicating the increase in thrust demand to the turbofan 10, the one or more processors of the controller 130 cause the electric machine to apply torque to the LP spool 34 such that a rotational speed of the LP spool 34 is increased. More particularly, the thrust demand scheduler 170 of the controller 130 determines the thrust demand schedule 180 for meeting the increased demanded thrust or providing a more rapid response to the increase in thrust demand via assistance from the electric machine 110. As noted above, the thrust demand schedule 180 includes a fuel flow schedule 182 and an electric current schedule 184. The fuel flow schedule 182 includes one or more fuel flow commands 186 that can be routed to the fuel control device 150. The electric current schedule 184 includes one or more electrical current commands 188 that can be routed to the electrical control device 120.

In addition to the input indicating the increase in thrust demand to the turbofan 10, the determined thrust demand schedule 180 can be determined based on one or more operating conditions received from aircraft sensors 214, aircraft systems 216, and engine sensors 140, calculated or otherwise modeled from the sensor outputs, etc. For instance, the altitude of the aircraft 200 at time t1 can determine the rate at which fuel is increased and the amperage directed to the electric machine 110 over the first time period. In addition, the determined thrust demand schedule 180 can be determined based on one or more constraints as described above.

In this example embodiment, the one or more processors of the controller 130 determine and implement the thrust demand schedule 180 such that at or immediately after time t1, the electric machine 110 applies torque to the LP shaft 34 to account for the increase in thrust demand. The torque applied to the LP shaft 34 by the electric machine 110 can account for all or nearly all of the increase in thrust demand or a portion/percentage thereof. By utilizing the electric machine 110 to account for at least a portion of the increase in thrust demand, the response to the thrust demand is more rapid, providing improved feel and control of the aerial vehicle 200 for a pilot. Accordingly, as shown in FIG. 6, the torque applied by the electric machine 110 on the LP shaft 34 is increased rapidly to meet the increase in thrust demand at or immediately after time t1. Further, at time t1, the one or more processors of the controller 130 cause, at rate not to exceed a predefined rate (e.g., set as a result of a received constraint from the HEC module 160, an increase in fuel flow to the combustor 26 of the turbofan 10 such that the rotational speed of the HP spool 30 is increased, and more particularly, gradually increased. For instance, as shown in FIG. 7, at time t1, fuel is input into the combustor 26 and the fuel input is increased gradually over the first time period. Notably, as the fuel input is increased over the first time period, as shown in FIG. 6, the torque applied by the electric machine 110 on the LP shaft 34 is decreased or ramped down (e.g., in a stepwise manner).

Accordingly, in this example embodiment, the electric machine 110 is utilized to input power to the LP shaft 34 to initially meet or substantially meet the increase in thrust demand. Then, over time, fuel is input at a rate not to exceed a predefined rate (i.e., to prevent rub events) and the electric current to the electric machine 110 is correspondingly decreased so that the thrust demand is eventually completely met by fuel input without use of the electric machine 110. However, as will be appreciated, in some flight conditions, the electric machine 110 can continue to assist the turbofan 10 in meeting the demanded thrust even after a burst event.

Figure 8:
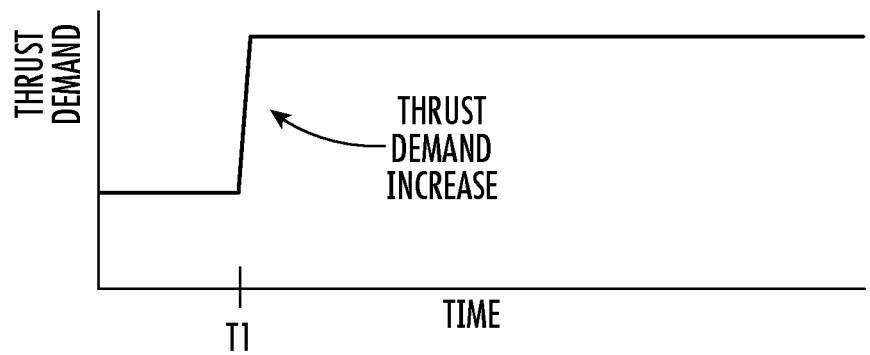
FIG. 8 provides a graph depicting thrust demand over a first time period in accordance with exemplary aspects of the present disclosure.
Figure 9:
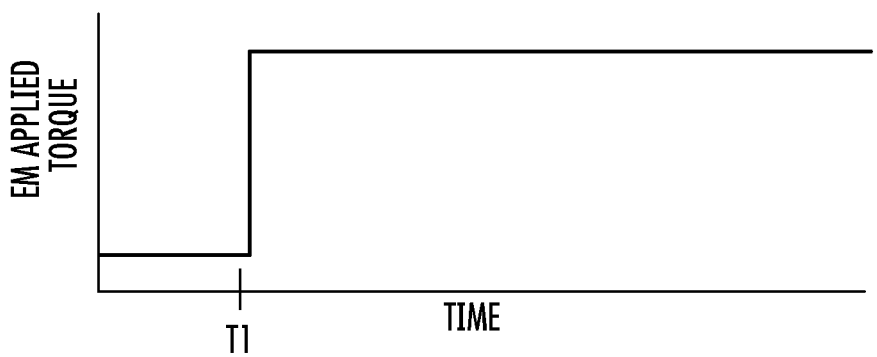
FIG. 9 provides a graph depicting electric machine applied torque over the first time period.
Figure 10:
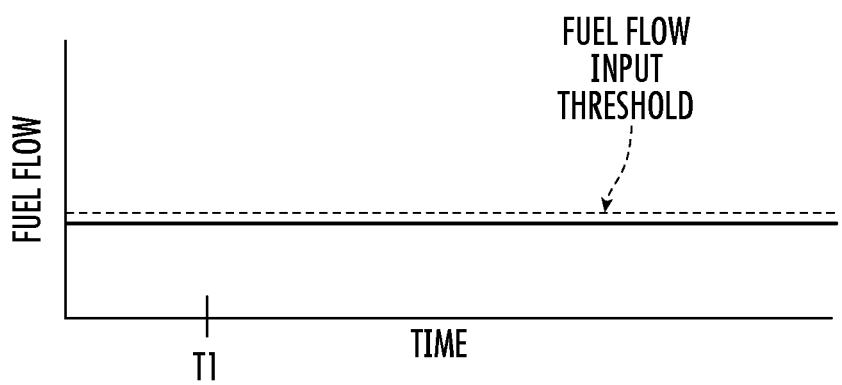
FIG. 10 provides a graph depicting fuel flow to a gas turbine engine over the first time period.

With reference now to FIGS. 3, 8, 9, and 10, another example manner in which the electric machine 110 can electrically assist the hybrid electric turbofan 10 to meet demanded thrust is provided. FIG. 8 provides a graph depicting thrust demand over a first time period, FIG. 9 provides a graph depicting electric machine applied torque over the first time period, and FIG. 10 provides a graph depicting fuel flow to the turbofan 10 over the first time period. In this example embodiment, generally, in response to a thrust demand increase, a computing system (e.g., controller 130) causes the electric machine 110 to meet all of the increase in thrust demand, and in such embodiments, the electric machine 110 can continue meeting the increase in thrust demand without any additional fuel input.

As depicted in FIG. 8, a pilot provides a user input requesting an increase in thrust at time t1. For instance, a pilot can provide a user input to thrust input device 210. For example, the pilot can move the thrust input device 210 to demand additional thrust, e.g., for performing a step climb during cruise operation. In response to the user input, or alternatively to an automatic thrust demand, the thrust demand scheduler 170 of the controller 130 receives an input indicating an increase in thrust demand to the turbofan 10.

In response to the received input indicating the increase in thrust demand to the turbofan 10, the one or more processors of the controller 130 cause the electric machine to apply torque to the LP spool 34 such that a rotational speed of the LP spool 34 is increased. As shown in FIG. 9, the torque applied by the electric machine 110 on the LP spool 34 is increased rapidly to meet the increase in thrust demand at or immediately after time t1. More particularly, in response to the received input indicating the increase in thrust demand to the turbofan 10, the thrust demand scheduler 170 of the controller 130 determines the thrust demand schedule 180 for meeting the increased demanded thrust. As noted above, the thrust demand schedule 180 includes a fuel flow schedule 182 and an electric current schedule 184. The fuel flow schedule 182 includes one or more fuel flow commands 186 that can be routed to the fuel control device 150. The electric current schedule 184 includes one or more electrical current commands 188 that can be routed to the electrical control device 120.

As noted previously, in addition to the input indicating the increase in thrust demand to the turbofan 10, the determined thrust demand schedule 180 can be determined based on one or more operating conditions received from aircraft sensors 214, aircraft systems 216, engine sensors 140, calculated or otherwise modeled from the sensor outputs, etc. For instance, the altitude of the aircraft 200 at time t1 can determine the rate at which fuel is increased and the amperage directed to the electric machine 110 over the first time period. In addition, the determined thrust demand schedule 180 can be determined based on one or more constraints as described above.

In this example embodiment, the one or more processors of the controller 130 determine and implement the thrust demand schedule 180 such that at or immediately after time t1, the electric machine 110 applies torque to the LP shaft 34 to account for all of the increase in thrust demand. Accordingly, as shown in FIG. 9, the torque applied by the electric machine 110 on the LP shaft 34 is increased rapidly to meet the increase in thrust demand at time t1. However, for this embodiment, the thrust demand schedule 180 is determined and implemented such that no additional fuel is input into the turbofan 10. Accordingly, the electric machine 110 continues meeting the increase in thrust demand without any additional fuel input. As shown in FIG. 10, no additional fuel is input into the turbofan 10.

In some embodiments, particularly during cruise operation, the fuel input can be limited to a predefined fuel input threshold. The predefined fuel input threshold can be received by the thrust demand scheduler 170 as a constraint. In some embodiments, the predefined fuel input threshold can be set or scheduled based at least in part on one or more operating conditions of the turbofan 10, aerial vehicle 200, electric machine 110, and/or other electrical components, such as the electrical power source 116. For instance, the predefined fuel input threshold can be scheduled based on, without limitation, the altitude of the aircraft 200, the electrical energy stored in the electrical power source 116, the amount of fuel remaining in the fuel source 152, the weight of the aircraft 200, a combination thereof, etc. In such embodiments, when the fuel input has reached or is at the predefined fuel input threshold and an increase in thrust demand is requested as shown in FIG. 8, e.g., at time t1, the increased thrust demand can be met entirely or solely by the electric machine 110 as shown in FIGS. 9 and 10. When the fuel input drops below the predefined fuel input threshold, fuel can be input into the turbofan 10 (e.g., into the combustor 26) and the electric machine 110 can be used for electrical assistance in meeting the increase in thrust demand.

Figure 11:
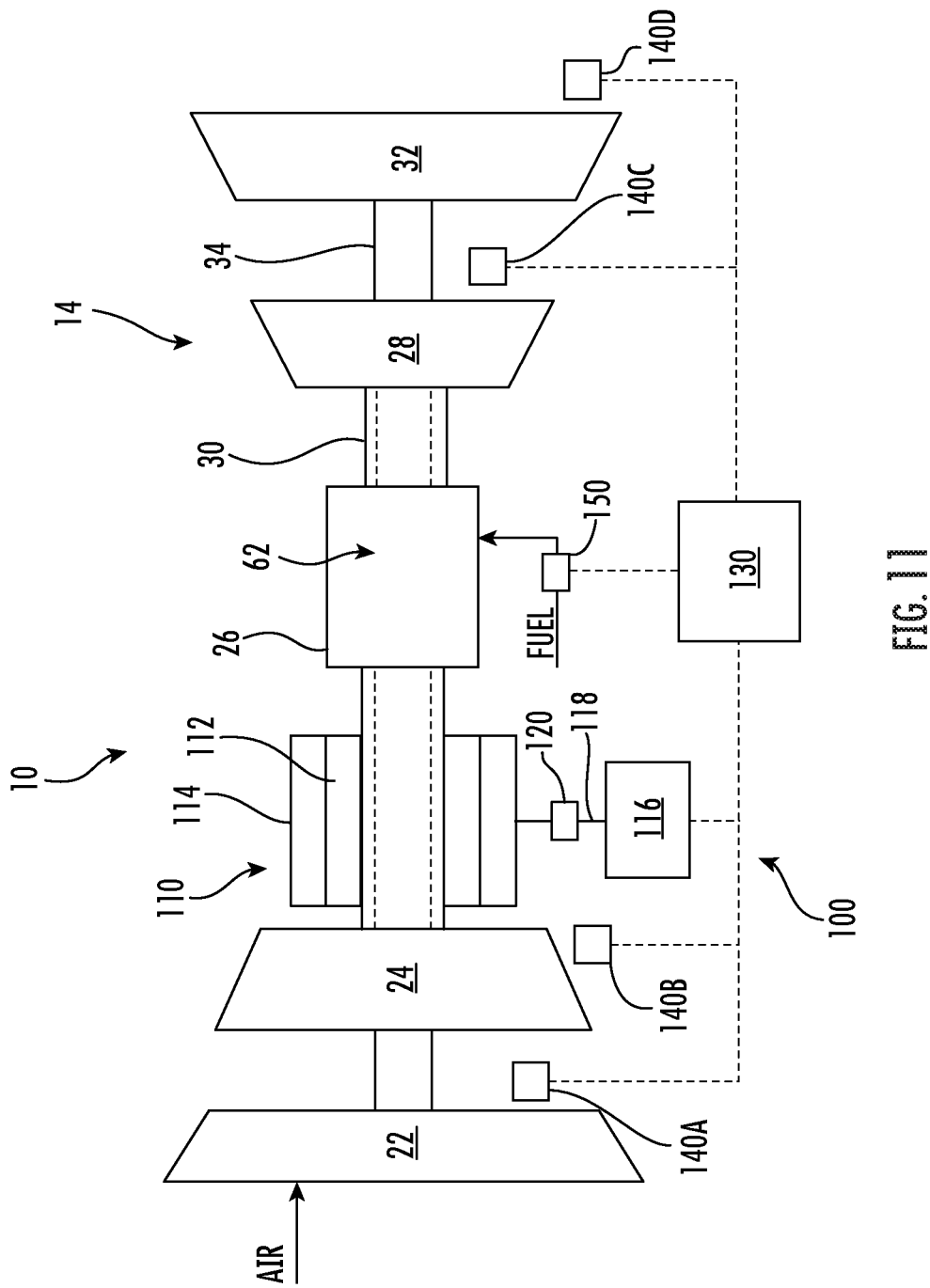
FIG. 11 provides a schematic view of a core turbine engine of another gas turbine engine according to an example embodiment of the present disclosure.

FIG. 11 provides a schematic view of a core turbine engine 14 of another gas turbine engine 10 having a control system 100 according to an example embodiment of the present disclosure. For this embodiment, the gas turbine engine 10 is similarly configured as the turbofan 10 of FIGS. 1 and 2 except that the electric machine 110 is operatively coupled with the HP spool 30 instead of the LP spool 34. The electric machine 110 can provide electrical assistance to the HP spool 30 in the same or similar manner as described herein with respect to the electric machine 110 providing electrical assistance to the LP spool 34.

Figure 12:
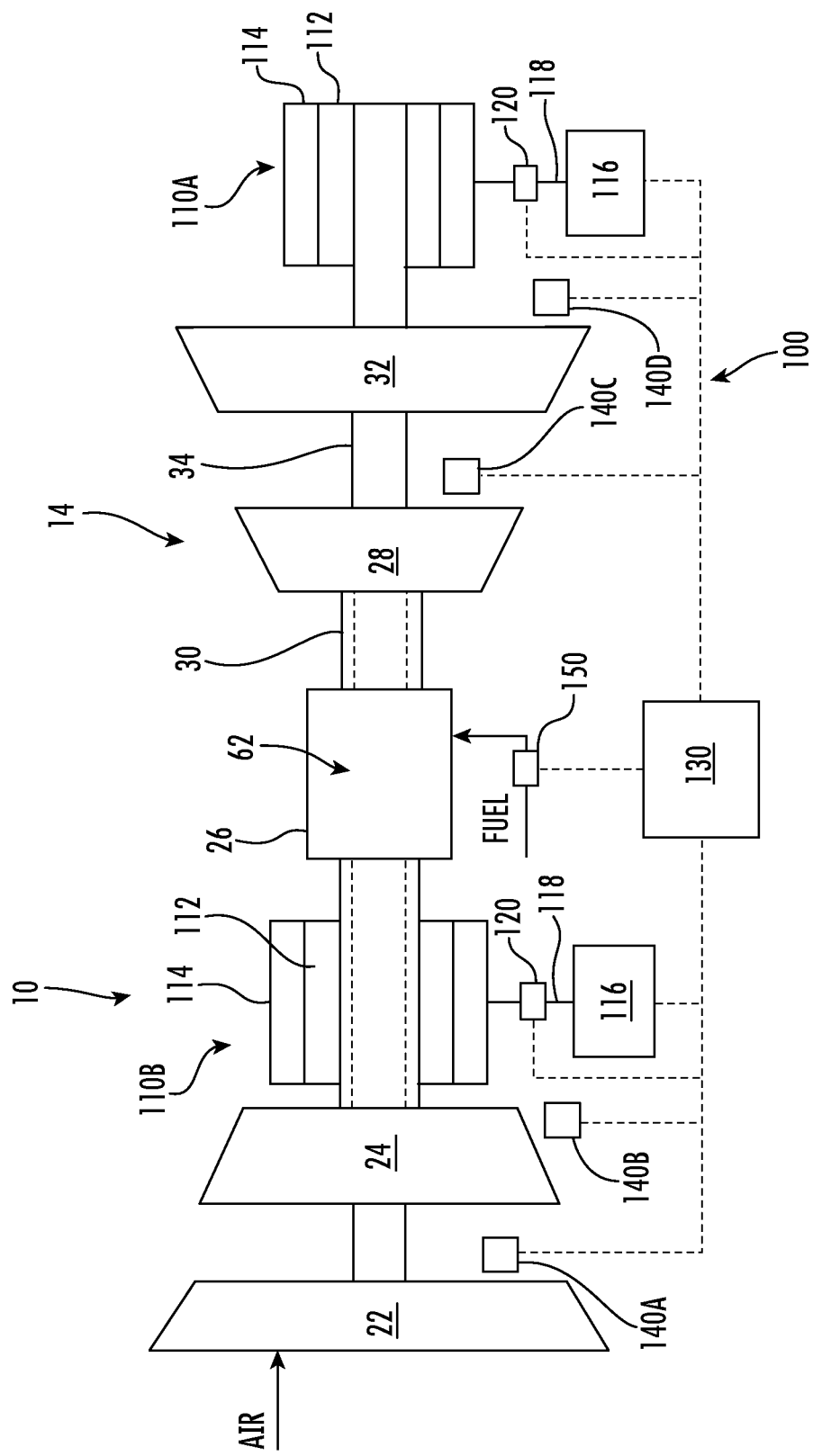
FIG. 12 provides a schematic view of a core turbine engine of another gas turbine engine having a control system according to an example embodiment of the present disclosure.

FIG. 12 provides a schematic view of a core turbine engine 14 of another gas turbine engine 10 having a control system 100 according to an example embodiment of the present disclosure. For this embodiment, the gas turbine engine 10 is similarly configured as the turbofan 10 of FIGS. 1 and 2 except that a first electric machine 110A is operatively coupled with the LP spool 34 and a second electric machine 110B is operatively coupled with the HP spool 30. The electric machines 110A, 110B are configured in the same or similar manner as the electric machine 110 described herein. The electric machine 110A can provide electrical assistance to the LP spool 34 in the same or similar manner as described herein with respect to the electric machine 110 providing electrical assistance to the LP spool 34 and the electric machine 110B can provide electrical assistance to the HP spool 30 in the same or similar manner as described herein with respect to the electric machine 110 providing electrical assistance to the LP spool 34.

Figure 13:
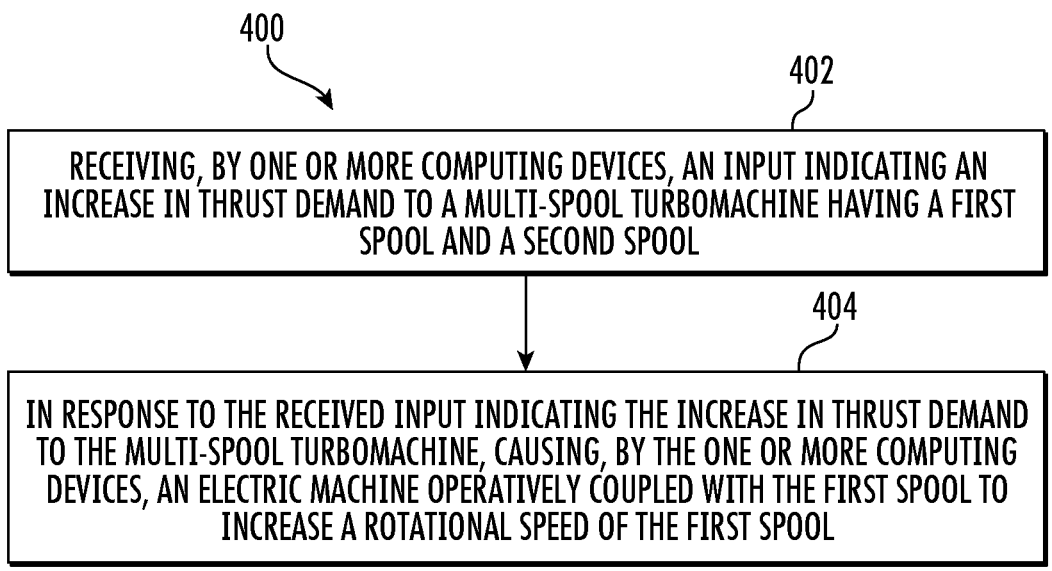
FIG. 13 provides a flow diagram of an exemplary method (400) of operating a hybrid electric multi-spool turbomachine in accordance with exemplary embodiments of the present disclosure.

FIG. 13 provides a flow diagram of an exemplary method (400) of operating a hybrid electric multi-spool turbomachine in accordance with exemplary embodiments of the present disclosure. For instance, the exemplary method (400) may be utilized for operating the hybrid electric turbofan 10 described herein. It should be appreciated that the method (400) is discussed herein only to describe exemplary aspects of the present subject matter and is not intended to be limiting.

At (402), the method (400) includes receiving, by one or more computing devices, an input indicating an increase in thrust demand to a multi-spool turbomachine having a first rotatable component and a second rotatable component, such as a first spool and a second spool, respectively. For instance, the controller 130 can receive the input in response to a user input (e.g., movement of a thrust input device 210) or automatically based on commands from a flight control system 212. In some implementations, the multi-spool turbomachine can have more than two spools.

At (404), in response to the received input indicating the increase in thrust demand to the multi-spool turbomachine, the method (400) includes causing, by the one or more computing devices, an electric machine operatively coupled with the first spool to increase a rotational speed of the first spool. For instance, as shown in FIG. 2, the controller 130 can cause the electrical control device 120 to direct electric current from the electrical power source 116 to the electric machine 110. The electric current causes the electric machine 110 to apply torque to the LP shaft 34, causing the LP shaft 34 to increase in rotational speed. In some implementations, the electric machine 110 applies torque to the LP spool 34 such that the rotational speed of the LP spool 34 increases independent of the HP spool 30 or any other spool of the turbofan 10.

In some implementations, the electric machine 110 can apply torque to the LP shaft 34 nearly instantaneously in response to an increase in demanded thrust. Further, in response to the thrust demand, the one or more computing devices can cause fuel to flow to a combustor 26 of the multi-spool turbofan 10. The fuel flow to the combustor 26 can be increased or gradually ramped up over a first time period, e.g., as shown in FIG. 7. Further, after causing, by the one or more computing devices, the electric machine 110 to increase the rotational speed of the LP spool 34, the one or more computing devices can cause an electrical current flow to the electric machine 110 to decrease over the first time period, e.g., as shown in FIG. 6. The electrical current flow to the electric machine 110 can be stepped down gradually as shown in FIG. 6 as the fuel input increases as shown in FIG. 7. Accordingly, due to the electrical assistance provided by the electric machine 110, the engine is responsive to the increase in thrust demand and the rotating and stationary components of the engine remain thermally matched without experiencing a rub event.

In some implementations, in response to the received input indicating the increase in thrust demand to the multi-spool turbomachine, the electric machine 110 can apply torque to the LP shaft 34 such that the increase in thrust demand is met or substantially met. Thereafter, the electric machine 110 can continue applying torque to the LP spool 34 to meet the increased demanded thrust, e.g., as shown in FIG. 9. In such implementations, no additional fuel need be input to the turbofan 10 as the electric machine 110 provides all of the additional thrust necessary to meet the thrust demand. In this manner, the fuel input can be kept below a fuel input threshold, e.g., as shown in FIG. 10. Such an implementation may be particularly useful at high altitudes, e.g., 25,000 feet and above.

Figure 14:
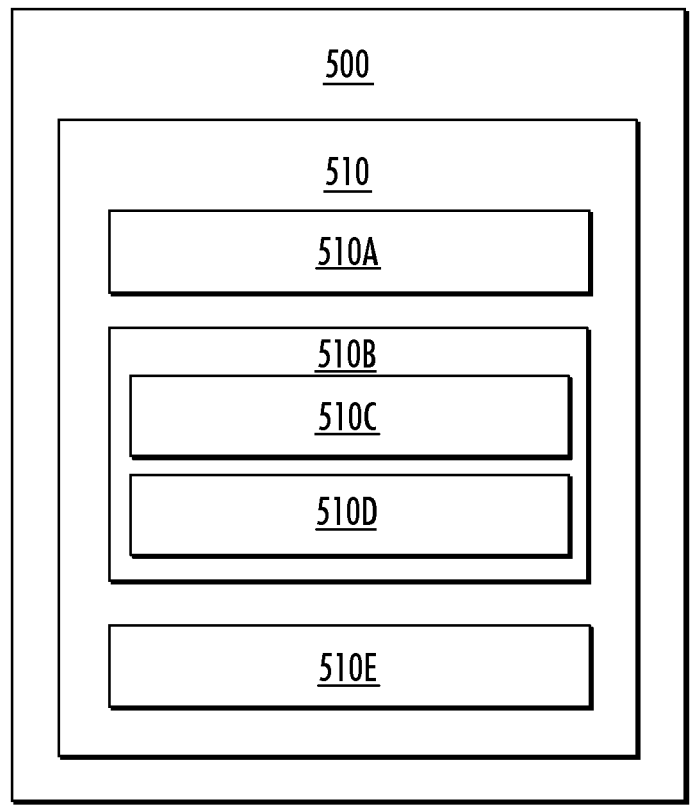
FIG. 14 provides an example computing system according to example embodiments of the present disclosure.

FIG. 14 provides an example computing system 500 according to example embodiments of the present disclosure. The computing systems (e.g., the controller 130) described herein may include various components and perform various functions of the computing system 500 described below, for example.

As shown in FIG. 14, the computing system 500 can include one or more computing device(s) 510. The computing device(s) 510 can include one or more processor(s) 510A and one or more memory device(s) 510B. The one or more processor(s) 510A can include any suitable processing device, such as a microprocessor, microcontroller, integrated circuit, logic device, and/or other suitable processing device. The one or more memory device(s) 510B can include one or more computer-readable media, including, but not limited to, non-transitory computer-readable media, RAM, ROM, hard drives, flash drives, and/or other memory devices.

The one or more memory device(s) 510B can store information accessible by the one or more processor(s) 510A, including computer-readable instructions 510C that can be executed by the one or more processor(s) 510A. The instructions 510C can be any set of instructions that when executed by the one or more processor(s) 510A, cause the one or more processor(s) 510A to perform operations. In some embodiments, the instructions 510C can be executed by the one or more processor(s) 510A to cause the one or more processor(s) 510A to perform operations, such as any of the operations and functions for which the computing system 500 and/or the computing device(s) 510 are configured, operations for electrically assisting a turbomachine during transient operation (e.g., method (400)), and/or any other operations or functions of the one or more computing device(s) 510. Accordingly, the method (400) may be a computer-implemented method, such that each of the steps of the exemplary method (400) are performed by one or more computing devices, such as the exemplary computing device 510 of the computing system 500. The instructions 510C can be software written in any suitable programming language or can be implemented in hardware. Additionally, and/or alternatively, the instructions 510C can be executed in logically and/or virtually separate threads on processor(s) 510A. The memory device(s) 510B can further store data 510D that can be accessed by the processor(s) 510A. For example, the data 510D can include models, databases, etc.

The computing device(s) 510 can also include a network interface 510E used to communicate, for example, with the other components of system 500 (e.g., via a network). The network interface 510E can include any suitable components for interfacing with one or more network(s), including for example, transmitters, receivers, ports, controllers, antennas, and/or other suitable components. One or more external devices, such as fuel control device(s) 150 and electrical control device(s) 120, can be configured to receive one or more commands from the computing device(s) 510 or provide one or more commands to the computing device(s) 510.

Figure 15:
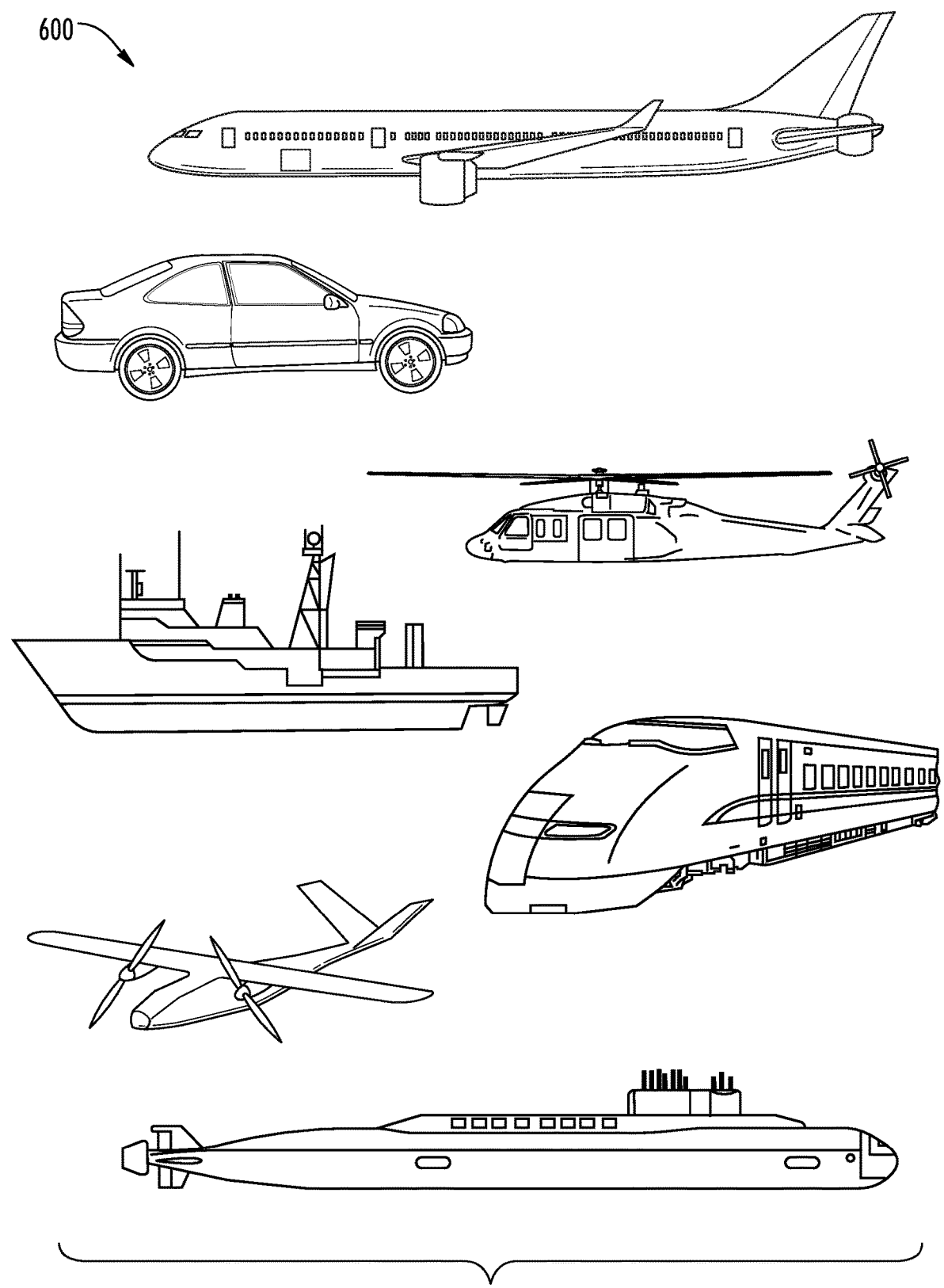
FIG. 15 provides example vehicles according to example embodiments of the present disclosure.

FIG. 15 provides example vehicles 600 according to example embodiments of the present disclosure. The hybrid electric turbomachines and methods of the present disclosure can be implemented on an aircraft, helicopter, automobile, boat, submarine, train, unmanned aerial vehicle or drone and/or on any other suitable vehicle. While the present disclosure is described herein with reference to an aircraft implementation, this is intended only to serve as an example and not to be limiting. One of ordinary skill in the art would understand that the hybrid electric turbomachines and methods of the present disclosure can be implemented on other vehicles without deviating from the scope of the present disclosure.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

1. A vehicle, comprising: a gas turbine engine, comprising: a first rotatable component; a second rotatable component; an electric machine operatively coupled with the first rotatable component and in communication with an electrical power source, the electric machine being operable to receive electrical power from the electrical power source; a computing system having one or more processors and one or more memory devices, the one or more memory devices storing instructions that when executed by the one or more processors cause the one or more processors to perform operations, in performing the operations, the one or more processors are configured to: receive an input indicating a change in a thrust demand to the gas turbine engine; and in response to the received input indicating the change in the thrust demand to the gas turbine engine, cause the electric machine to change an applied torque on the first rotatable component such that a rotational speed of the first rotatable component is changed.

2. The vehicle of any preceding clause, wherein the first rotatable component is a low pressure spool and the second rotatable component is a high pressure spool.

3. The vehicle of any preceding clause, wherein the first rotatable component is a high pressure spool and the second rotatable component is a low pressure spool.

4. The vehicle of any preceding clause, wherein the change in the thrust demand to the gas turbine engine is a decrease in the thrust demand to the gas turbine engine, and wherein when the one or more processors cause the electric machine to change the applied torque on the first rotatable component, the electric machine decreases the applied torque on the first rotatable component or causes the electric machine to apply a drag torque on the first rotatable component such that the rotational speed of the first rotatable component is decreased.

5. The vehicle of any preceding clause, wherein the change in the thrust demand to the gas turbine engine is an increase in the thrust demand to the gas turbine engine, and wherein when the one or more processors cause the electric machine to change the applied torque on the first rotatable component, the electric machine increases the applied torque on the first rotatable component such that the rotational speed of the first rotatable component is increased.

6. The vehicle of any preceding clause, wherein in response to the received input indicating the change in the thrust demand to the gas turbine engine, the one or more processors are configured to: cause, at rate not to exceed a predefined rate, an increase in fuel flow to the gas turbine engine such that the rotational speed of the second rotatable component is increased.

7. The vehicle of any preceding clause, wherein the one or more processors are configured to: determine a thrust demand schedule to meet the thrust demand over time based at least in part on the received input indicating the change in the thrust demand to the gas turbine engine, the thrust demand schedule including a schedule of fuel flow to the gas turbine engine over time and a schedule of electrical current flow to the electric machine over time, and wherein the one or more processors: i) control fuel flow to the gas turbine engine over time based at least in part on the determined schedule of fuel flow to the gas turbine engine over time; and ii) control electrical current flow to the electric machine over time based at least in part on the determined schedule of electrical current flow to the electric machine over time.

8. The vehicle of any preceding clause, wherein the one or more processors are configured to: receive an input indicative of one or more operating conditions of the gas turbine engine, and wherein the thrust demand schedule is determined by the one or more processors based at least in part on the input indicative of the one or more operating conditions of the gas turbine engine.

9. The vehicle of any preceding clause, wherein the one or more operating conditions of the gas turbine engine include at least one of an altitude at which the gas turbine engine is operating, an airspeed of the vehicle, and an ambient temperature outside of the vehicle.

10. The vehicle of any preceding clause, wherein the gas turbine engine further comprises a fuel control device operable to control fuel flow to the gas turbine engine, the fuel control device being communicatively coupled with the computing system, and wherein the vehicle further comprises an electrical current control device operable to control electrical current flow to the electric machine, the electrical current control device being communicatively coupled with the computing system, and wherein the schedule of fuel flow to the gas turbine engine over time includes one or more fuel flow commands and the schedule of electrical current flow to the electric machine over time includes one or more electrical current commands, and wherein in controlling fuel flow to the gas turbine over time based at least in part on the determined schedule of fuel flow to the gas turbine engine over time, the one or more processors are configured to cause the fuel control device to control fuel flow to the gas turbine engine based at least in part on the one or more fuel flow control commands, and wherein in controlling electrical current flow to the electric machine over time based at least in part on the determined schedule of electrical current flow to the electric machine over time, the one or more processors are configured to cause the electrical current control device to control electrical current to the electric machine based at least in part on the one or more electrical current control commands.

11. The vehicle of any preceding clause, wherein the one or more processors control fuel flow to the gas turbine engine over time and control electrical current flow to the electric machine over time such that fuel flow to the gas turbine engine is gradually ramped up over time and electrical current flow to the electric machine is ramped down over time.

12. A turbomachine for a vehicle, comprising: a first rotatable component; a second rotatable component; an electric machine operatively coupled with the first rotatable component; and a controller having one or more processors and one or more memory devices, the one or more memory devices storing instructions that when executed by the one or more processors cause the one or more processors to perform operations, in performing the operations, the one or more processors are configured to: receive an input indicating an increase in thrust demand to the turbomachine; and in response to the increase in the thrust demand to the turbomachine, cause the electric machine to apply torque to the first rotatable component.

13. The turbomachine of any preceding clause, wherein the first rotatable component is a low pressure spool and the second rotatable component is a high pressure spool.

14. The turbomachine of any preceding clause, wherein the first rotatable component is a high pressure spool and the second rotatable component is a low pressure spool.

15. The turbomachine of any preceding clause, wherein the one or more processors of the controller are configured to: cause an increase in a fuel flow to the turbomachine such that a rotational speed of the second rotatable component is increased.

16. The turbomachine of any preceding clause, wherein the one or more processors of the controller control the increase in the fuel flow to the turbomachine over a first time period and control an electrical current flow to the electric machine over the first time period such that the fuel flow to the turbomachine is gradually increased over the first time period and the electrical current flow to the electric machine is decreased over the first time period.

17. The turbomachine of any preceding clause, wherein the one or more processors of the controller are configured to: receive an input indicative of a constraint descriptive of a fuel input threshold, and wherein when fuel flow to the turbomachine reaches the fuel input threshold, the increase in thrust demand is met solely by application of torque applied to the first rotatable component by the electric machine.

18. A method, comprising: receiving, by one or more computing devices, an input indicating an increase in thrust demand to a multi-spool turbomachine having a first spool and a second spool; in response to the received input indicating the increase in thrust demand to the multi-spool turbomachine, causing, by the one or more computing devices, an electric machine operatively coupled with the first spool to increase a rotational speed of the first spool.

19. The method of any preceding clause, wherein causing, by the one or more computing devices, the electric machine to increase the rotational speed of the first spool comprises causing, by the one or more computing devices, the electric machine to apply torque to the first spool such that the rotational speed of the first spool increases independent of the second spool.

20. The method of any preceding clause, wherein causing, by the one or more computing devices, the electric machine operatively coupled with the first spool to increase the rotational speed of the first spool comprises causing, by the one or more computing devices, the electric machine to increase the rotational speed of the first spool such that the thrust demand is substantially met, and wherein the method further comprises: causing, by the one or more computing devices, a fuel flow to a combustor of the multi-spool turbomachine, wherein the fuel flow to the combustor increases gradually at over a first time period; and after causing, by the one or more computing devices, the electric machine to increase the rotational speed of the first spool such that the thrust demand is substantially met, causing, by the one or more computing devices, an electrical current flow to the electric machine to decrease over the first time period.

What is claimed is:

1. A vehicle, comprising:
   a gas turbine engine, comprising:
      a first rotatable component;
      a second rotatable component;
      an electric machine operatively coupled with the first rotatable component and in communication with an electrical power source, the electric machine being operable to receive electrical power from the electrical power source;
   a computing system having one or more processors and one or more memory devices, the one or more memory devices storing instructions that when executed by the one or more processors cause the one or more processors to perform operations, in performing the operations, the one or more processors are configured to:
      receive an input indicating a change in a thrust demand to the gas turbine engine;
      determine whether a fuel input has reached a predefined fuel input threshold; and
      in response to the received input indicating the change in the thrust demand to the gas turbine engine, cause the electric machine to change an applied torque on the first rotatable component such that a rotational speed of the first rotatable component is changed, and
   wherein when fuel flow to the turbomachine reaches the fuel input threshold, the increase in thrust demand is met by application of torque applied to the first rotatable component by the electric machine and without inputting fuel into the gas turbine engine, and
   wherein when fuel flow to the turbomachine does not reach the fuel input threshold, fuel is input into the gas turbine engine so that a rotational speed of the second rotatable component is increased as the electric machine is caused to change the applied torque on the first rotatable component.

2. The vehicle of claim 1, wherein the first rotatable component is a low pressure spool and the second rotatable component is a high pressure spool.

3. The vehicle of claim 1, wherein the first rotatable component is a high pressure spool and the second rotatable component is a low pressure spool.

4. The vehicle of claim 1, wherein the change in the thrust demand to the gas turbine engine is a decrease in the thrust demand to the gas turbine engine, and wherein when the one or more processors cause the electric machine to change the applied torque on the first rotatable component, the electric machine decreases the applied torque on the first rotatable component or causes the electric machine to apply a drag torque on the first rotatable component such that the rotational speed of the first rotatable component is decreased.

5. The vehicle of claim 1, wherein the change in the thrust demand to the gas turbine engine is an increase in the thrust demand to the gas turbine engine, and wherein when the one or more processors cause the electric machine to change the applied torque on the first rotatable component, the electric machine increases the applied torque on the first rotatable component such that the rotational speed of the first rotatable component is increased.

6. The vehicle of claim 5, wherein in response to the received input indicating the change in the thrust demand to the gas turbine engine, the one or more processors are configured to:
   cause, at a rate not to exceed a predefined rate, an increase in fuel flow to the gas turbine engine such that the rotational speed of the second rotatable component is increased.

7. The vehicle of claim 1, wherein the one or more processors are configured to:
   determine a thrust demand schedule to meet the thrust demand over time based at least in part on the received input indicating the change in the thrust demand to the gas turbine engine, the thrust demand schedule including a schedule of fuel flow to the gas turbine engine over time and a schedule of electrical current flow to the electric machine over time, and
   wherein the one or more processors:
      i) control fuel flow to the gas turbine engine over time based at least in part on the determined schedule of fuel flow to the gas turbine engine over time; and
      ii) control electrical current flow to the electric machine over time based at least in part on the determined schedule of electrical current flow to the electric machine over time.

8. The vehicle of claim 7, wherein the one or more processors are configured to:
   receive an input indicative of one or more operating conditions of the gas turbine engine, and
   wherein the thrust demand schedule is determined by the one or more processors based at least in part on the input indicative of the one or more operating conditions of the gas turbine engine.

9. The vehicle of claim 8, wherein the one or more operating conditions of the gas turbine engine include at least one of an altitude at which the gas turbine engine is operating, an airspeed of the vehicle, and an ambient temperature outside of the vehicle.

10. The vehicle of claim 7, wherein the gas turbine engine further comprises a fuel control device operable to control fuel flow to the gas turbine engine, the fuel control device being communicatively coupled with the computing system, and
   wherein the vehicle further comprises an electrical current control device operable to control electrical current flow to the electric machine, the electrical current control device being communicatively coupled with the computing system, and
   wherein the schedule of fuel flow to the gas turbine engine over time includes one or more fuel flow commands and the schedule of electrical current flow to the electric machine over time includes one or more electrical current commands, and wherein in controlling fuel flow to the gas turbine engine over time based at least in part on the determined schedule of fuel flow to the gas turbine engine over time, the one or more processors are configured to cause the fuel control device to control fuel flow to the gas turbine engine based at least in part on the one or more fuel flow control commands, and wherein in controlling electrical current flow to the electric machine over time based at least in part on the determined schedule of electrical current flow to the electric machine over time, the one or more processors are configured to cause the electrical current control device to control electrical current to the electric machine based at least in part on the one or more electrical current control commands.

11. The vehicle of claim 7, wherein the one or more processors control fuel flow to the gas turbine engine over time and control electrical current flow to the electric machine over time such that fuel flow to the gas turbine engine is linearly ramped up over time and electrical current flow to the electric machine is ramped down over time.

12. A turbomachine for a vehicle, comprising:
a first rotatable component;
a second rotatable component;
an electric machine operatively coupled with the first rotatable component; and
a controller having one or more processors and one or more memory devices, the one or more memory devices storing instructions that when executed by the one or more processors cause the one or more processors to perform operations, in performing the operations, the one or more processors are configured to:
receive an input indicating an increase in thrust demand to the turbomachine;
receive an input indicative of a constraint descriptive of a fuel input threshold; and
in response to the increase in the thrust demand to the turbomachine, cause the electric machine to apply torque to the first rotatable component, and
wherein when fuel flow to the turbomachine reaches the fuel input threshold, the increase in thrust demand is met solely by application of torque applied to the first rotatable component by the electric machine, and
wherein when fuel flow to the turbomachine does not reach the fuel input threshold, fuel is input into the turbomachine so that a rotational speed of the second rotatable component is increased as the electric machine is caused to change the applied torque on the first rotatable component.

13. The turbomachine of claim 12, wherein the first rotatable component is a low pressure spool and the second rotatable component is a high pressure spool.

14. The turbomachine of claim 12, wherein the first rotatable component is a high pressure spool and the second rotatable component is a low pressure spool.

15. The turbomachine of claim 12, wherein the one or more processors of the controller are configured to:
cause an increase in a fuel flow to the turbomachine such that a rotational speed of the second rotatable component is increased.

16. The turbomachine of claim 15, wherein the one or more processors of the controller control the increase in the fuel flow to the turbomachine over a first time period and control an electrical current flow to the electric machine over the first time period such that the fuel flow to the turbomachine is linearly increased over the first time period and the electrical current flow to the electric machine is decreased over the first time period.

17. The turbomachine of claim 12, wherein the electrical current flow to the electric machine is decreased over the first time period such that torque applied on the first rotatable component by the electric machine is decreased in a stepwise manner.

18. A method, comprising:
receiving, by one or more computing devices, an input indicating an increase in thrust demand to a multi-spool turbomachine having a first spool and a second spool;
receiving, by the one or more computing devices, an input indicative of a constraint descriptive of a fuel input threshold to the multi-spool turbomachine; and
in response to the received input indicating the increase in thrust demand to the multi-spool turbomachine, causing, by the one or more computing devices, an electric machine operatively coupled with the first spool to increase a rotational speed of the first spool, and
wherein when fuel flow to the turbomachine reaches the fuel input threshold, the increase in thrust demand is met by application of torque applied to the first spool by the electric machine and without inputting fuel into the turbomachine, and
wherein when fuel flow to the turbomachine does not reach the fuel input threshold, fuel is input into the turbomachine so that a rotational speed of the second spool is increased as the electric machine is caused to change the applied torque on the first spool.

19. The method of claim 18, wherein causing, by the one or more computing devices, the electric machine to increase the rotational speed of the first spool comprises causing, by the one or more computing devices, the electric machine to apply torque to the first spool such that the rotational speed of the first spool increases independent of the second spool.

20. The method of claim 19, wherein causing, by the one or more computing devices, the electric machine operatively coupled with the first spool to increase the rotational speed of the first spool comprises causing, by the one or more computing devices, the electric machine to increase the rotational speed of the first spool such that the thrust demand is substantially met, and wherein the method further comprises:
causing, by the one or more computing devices, a fuel flow to a combustor of the multi-spool turbomachine, wherein the fuel flow to the combustor increases linearly over a first time period; and
after causing, by the one or more computing devices, the electric machine to increase the rotational speed of the first spool such that the thrust demand is substantially met, causing, by the one or more computing devices, an electrical current flow to the electric machine to decrease over the first time period.

* * * * *